United States Patent [19]

Yamamoto et al.

[11] Patent Number: 5,163,137
[45] Date of Patent: Nov. 10, 1992

[54] COPYING SYSTEM WITH A DUAL TRUNK SERIAL COMMUNICATION SYSTEM USING AN ACKNOWLEDGE LINE

[75] Inventors: Haruo Yamamoto, Sennan; Katsumi Amakawa, Yamatotakada, both of Japan

[73] Assignee: Mita Industrial Co., Ltd., Osaka, Japan

[21] Appl. No.: 523,281

[22] Filed: May 11, 1990

Related U.S. Application Data

[63] Continuation of Ser. No. 262,552, Oct. 25, 1988, abandoned.

Foreign Application Priority Data

Oct. 29, 1987 [JP] Japan .................... 62-274500

[51] Int. Cl.⁵ ............... G06F 13/40; G06F 13/38; G06F 11/10; G06F 11/00
[52] U.S. Cl. ................. 395/325; 395/575; 355/200; 355/204; 355/205; 371/33; 340/825.06; 364/240; 364/240.1; 364/240.5; 364/DIG. 1; 364/230; 364/230.4; 364/265.1; 364/266.3; 364/940; 364/940.1; 364/937; 364/942.4
[58] Field of Search ............ 371/33, 62, 16.4; 364/200 MS File, 900 MS File; 395/800; 355/200, 204, 205; 340/825.06

[56] References Cited

U.S. PATENT DOCUMENTS

| | | | |
|---|---|---|---|
| 3,676,846 | 7/1972 | Busch | 340/146.1 BA |
| 3,754,211 | 8/1973 | Rocher et al. | 340/146.1 BA |
| 4,122,996 | 10/1978 | Wilczek | 235/302.3 |
| 4,241,398 | 12/1980 | Carll | 364/200 |
| 4,266,294 | 5/1981 | Daughton et al. | 364/900 |
| 4,282,583 | 8/1981 | Khan et al. | 364/900 |
| 4,511,958 | 4/1985 | Funk | 364/200 |
| 4,755,996 | 7/1988 | Masuda | 371/16 |

Primary Examiner—Thomas C. Lee
Assistant Examiner—Caleb Pollack
Attorney, Agent, or Firm—Jordan and Hamburg

[57] ABSTRACT

An interface system for a copying system, wherein a frame of transmission data employing a serial communication between a copying machine main body and peripheral devices thereof comprises an address block, a data block and a checksum data block, an optional device corresponding to an address transmitted from the main body transfers data to the main body when the data received coincides with checksum data obtained in the device based on the received data and the transfer of the data is complete when the main body confirms that the transmission address coincides with the transferred data, and when the transferred data is not returned from the optional device or the coincidence is not confirmed, it is determined that a transmission error occurs and data is transmitted from the main body again, whereby reliability of transmission is improved.

6 Claims, 32 Drawing Sheets

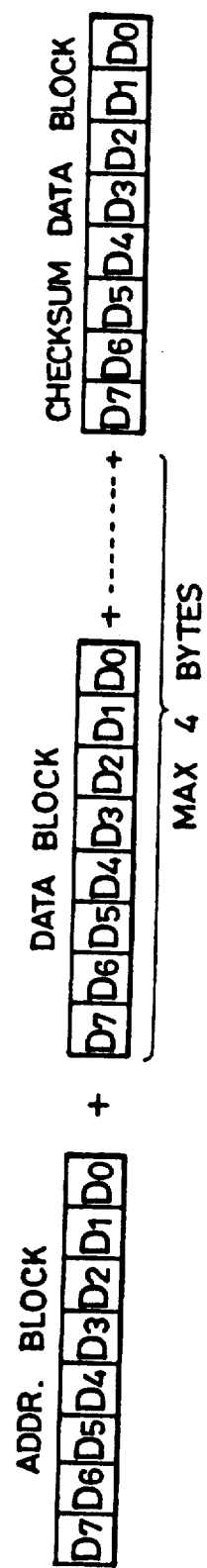
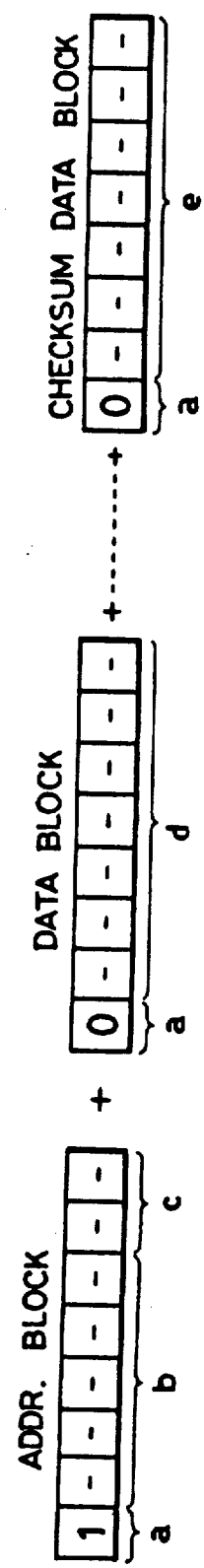

FIG.6

| D7 | D6 | D5 | D4 | D3 | D2 | D1 | D0 |
|---|---|---|---|---|---|---|---|
| 1 | 0 | 0 | 0 | 0 | 0 | - | - |
| 1 | 0 | 0 | 0 | 0 | 1 | - | - |
| 1 | 0 | 0 | 0 | 1 | 0 | - | - |
| 1 | 0 | 0 | 0 | 1 | 1 | - | - |

ADDR. BLOCK

- ---- TRANS. REQUEST COMM. ADDR.
- ---- TRANS. INITIAL COMM. ADDR.
- ---- RECEIVE COMPLETE COMM. ADDR.
- ---- OPTIONAL TYPE COMM. ADDR.

FIG.7

| D7 | D6 | D5 | D4 | D3 | D2 | D1 | D0 |
|---|---|---|---|---|---|---|---|
| 1 | - | - | - | - | - | 0 | 0 |
| 1 | - | - | - | - | - | 0 | 1 |
| 1 | - | - | - | - | - | 1 | 0 |
| 1 | - | - | - | - | - | 1 | 1 |

ADDR. BLOCK

- ---- ONE DATA BLOCK SUCCEEDS ADDR. BLOCK
- ---- TWO DATA BLOCKS SUCCEED ADDR. BLOCK
- ---- THREE DATA BLOCKS SUCCEED ADDR. BLOCK
- ---- FOUR DATA BLOCKS SUCCEED ADDR. BLOCK

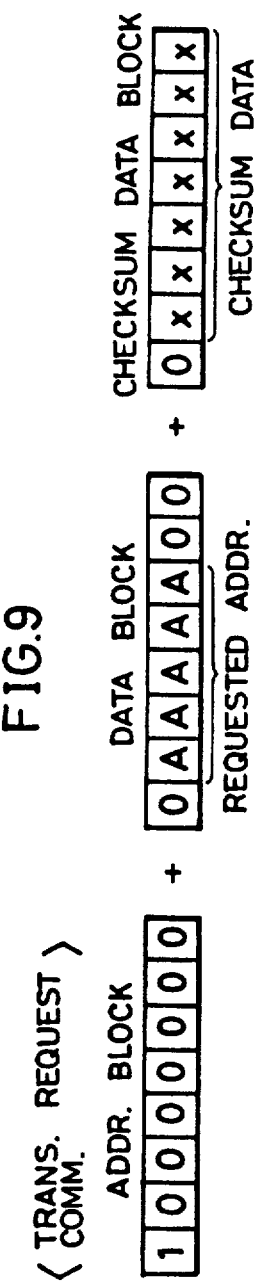
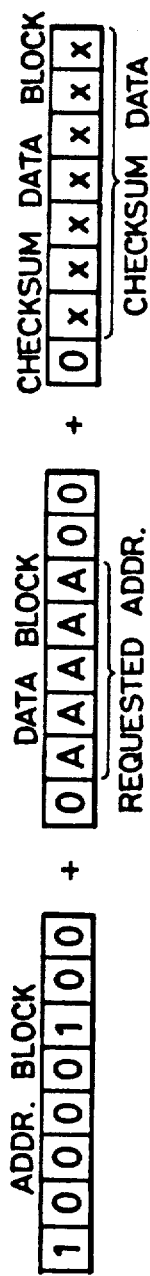
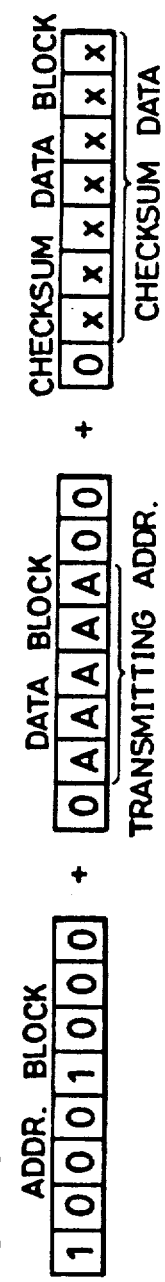
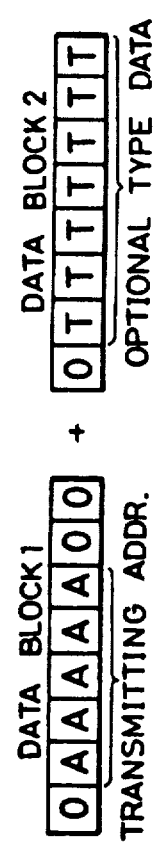
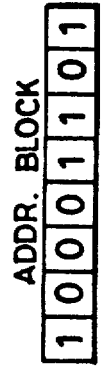
FIG.9  FIG.10  FIG.11  FIG.12

⟨ADDR. BLOCK⟩

| D7 | D6 | D5 | D4 | D3 | D2 | D1 | D0 | |
|----|----|----|----|----|----|----|----|---|
| 1  | 0  | 0  | 1  | 0  | 0  | -  | -  | MAIN BODY → ADF TRANSFER ADDR. |
| 1  | 0  | 0  | 1  | 0  | 1  | -  | -  | ADF → MAIN BODY TRANSFER ADDR. |
| 1  | 0  | 0  | 1  | 1  | 0  | -  | -  | MAIN BODY → SORTER TRANSFER ADDR. |
| 1  | 0  | 0  | 1  | 1  | 1  | -  | -  | SORTER → MAIN BODY TRANSFER ADDR. |
| 1  | 0  | 1  | 0  | 0  | 0  | -  | -  | MAIN BODY → ST TRANSFER ADDR. |
| 1  | 0  | 1  | 0  | 0  | 1  | -  | -  | ST → MAIN BODY TRANSFER ADDR. |
| 1  | 1  | 1  | 1  | 1  | 1  |    |    | |

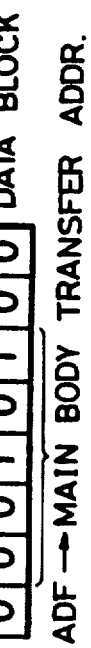
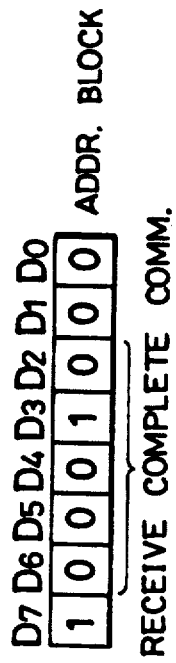
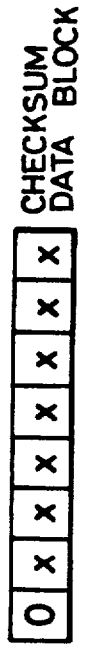
FIG.16
ADF → RECEIVE COMPLETE COMM. (II)
ADDR. BLOCK
RECEIVE COMPLETE COMM.
DATA BLOCK
ADF → MAIN BODY TRANSFER ADDR.
CHECKSUM DATA BLOCK
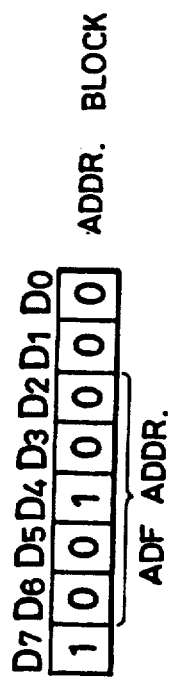
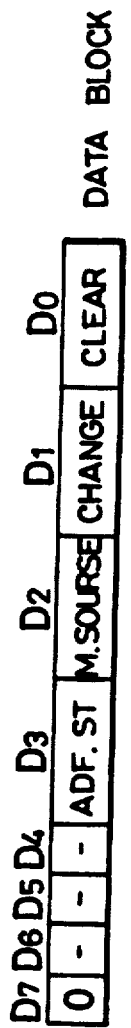
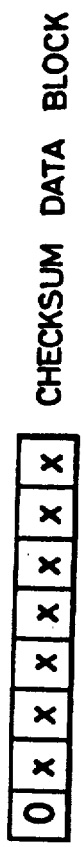
FIG.15
MAIN BODY → ADF DATA TRANSFER (I)
ADDR. BLOCK
ADF ADDR.
DATA BLOCK
CHECKSUM DATA BLOCK

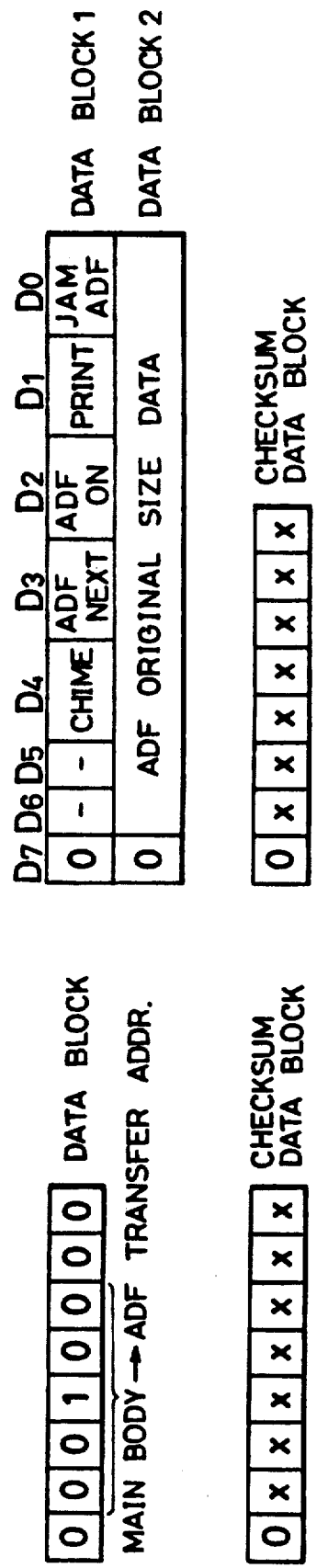

FIG.19

MAIN BODY → SORTER DATA TRANSFER (1)

| D7 | D6 | D5 | D4 | D3 | D2 | D1 | D0 |
|----|----|----|----|----|----|----|----|
| 1  | 0  | 0  | 1  | 1  | 0  | 0  | 1  |

ADDR. BLOCK

MAIN BODY → SORTER TRANSFER ADDR.

| D7 | D6 | D5 | D4 | D3 | D2 | D1 | D0 | |
|----|----|----|----|----|----|----|----|----|
| 0 | - | - | INT | M.SOUCE | GROUP | SORT | N.SORT | DATA BLOCK 1 |
| 0 | - | - | - | - | COPY | KEY SET | FINAL | DATA BLOCK 2 |

| 0 | x | x | x | x | x | x | x |
|---|---|---|---|---|---|---|---|

CHECKSUM DATA BLOCK

FIG.20
SORTER → RECEIVE COMPLETE COMM.(II)
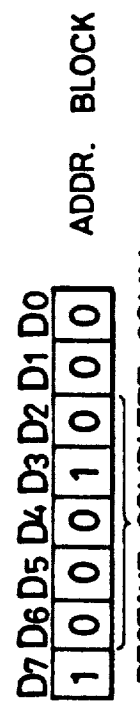
ADDR. BLOCK
RECEIVE COMPLETE COMM.
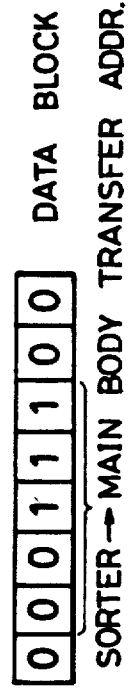
DATA BLOCK
SORTER → MAIN BODY TRANSFER ADDR.
CHECKSUM DATA BLOCK

FIG.21

MAIN BODY → SORTER TRANS. REQUEST (I)

| D7 | D6 | D5 | D4 | D3 | D2 | D1 | D0 |
|----|----|----|----|----|----|----|----|
| 1  | 0  | 0  | 0  | 0  | 0  | 0  | 0  |

ADDR. BLOCK

TRANS. REQUEST COMM. (D6–D1)

| 0 | 0 | 0 | 1 | 1 | 0 | 0 | 0 |

DATA BLOCK

MAIN BODY → SORTER TRANSFER ADDR.

| 0 | x | x | x | x | x | x | x |

CHECKSUM DATA BLOCK

FIG.22

SORTER → MAIN BODY DATA TRANSFER (II)

| D7 | D6 | D5 | D4 | D3 | D2 | D1 | D0 |
|----|----|----|----|----|----|----|----|
| 1  | 0  | 0  | 1  | 1  | 1  | 0  | 0  |

ADDR. BLOCK

SORTER → MAIN BODY TRANSFER ADDR.

| D7 | D6 | D5 | D4 | D3 | D2 | D1 | D0 |
|----|----|----|----|----|----|----|----|
| 0  | -  | -  | HALT | S. JAM | GROUP LED | SORT LED | N. SORT LED |

DATA BLOCK

| 0 | x | x | x | x | x | x | x |

CHECKSUM DATA BLOCK

FIG.23

SPECIAL TRAY(S.T.) INTERFACE
MAIN BODY → S.T. DATA TRANSFER (1)

| D7 | D6 | D5 | D4 | D3 | D2 | D1 | D0 |
|----|----|----|----|----|----|----|----|
| 1  | 0  | 1  | 0  | 0  | 0  | 0  | 1  |

ADDR. BLOCK

MAIN BODY → S.T. TRANSFER. ADDR.

| D7 | D6 | D5 | D4 | D3 | D2 | D1 | D0 |
|----|----|----|----|----|----|----|----|
| 0  | AUTO CHANGE | M.COPY | M.INT | M.SOURCE | SELECT | Feed NEXT | Feed |

DATA BLOCK

| 0 | x | x | x | x |
|---|---|---|---|---|

CHECKSUM DATA BLOCK

FIG. 24
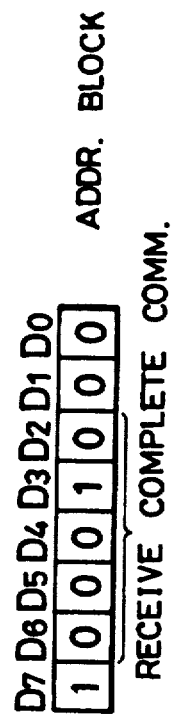
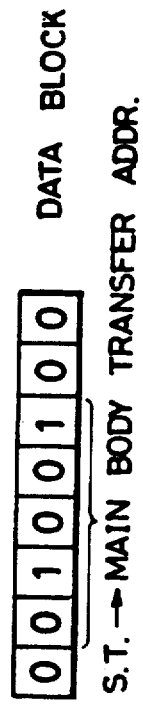
S.T. → RECEIVE COMPLETE COMM. (II)
ADDR. BLOCK
| D7 | D6 | D5 | D4 | D3 | D2 | D1 | D0 |
|---|---|---|---|---|---|---|---|
| 1 | 0 | 0 | 0 | 1 | 0 | 0 | 0 |
RECEIVE COMPLETE COMM.
DATA BLOCK
| 0 | 0 | 1 | 0 | 0 | 1 | 0 | 0 |
|---|---|---|---|---|---|---|---|
S.T. → MAIN BODY TRANSFER ADDR.
CHECKSUM DATA BLOCK
| 0 | x | x | x | x | x | x | x |
|---|---|---|---|---|---|---|---|

FIG. 25
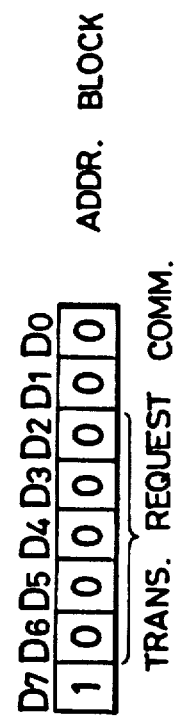
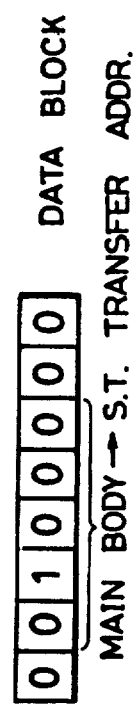

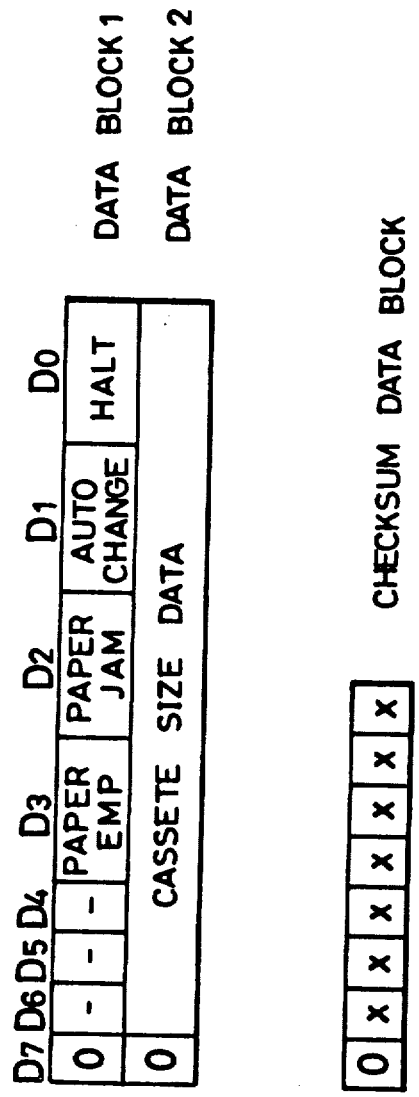

FIG.27

MAIN BODY → OPTIONAL TRANS. INITIAL COMM.(I)

| $D_7$ | $D_6$ | $D_5$ | $D_4$ | $D_3$ | $D_2$ | $D_1$ | $D_0$ |
|---|---|---|---|---|---|---|---|
| 1 | 0 | 0 | 0 | 0 | 1 | 0 | 0 |

ADDR. BLOCK
(TRANS. INITIAL COMM.)

| 0 | A | A | A | A | A | 0 | 0 |

DATA BLOCK
MAIN BODY → OPTIONAL TRANSFER ADDR.

| 0 | x | x | x | x | x | x | x |

CHECKSUM DATA BLOCK

FIG.28

OPTIONAL → MAIN BODY OPTIONAL TYPE COMM.(II)

| $D_7$ | $D_6$ | $D_5$ | $D_4$ | $D_3$ | $D_2$ | $D_1$ | $D_0$ |
|---|---|---|---|---|---|---|---|
| 1 | 0 | 0 | 0 | 1 | 1 | 0 | 1 |

ADDR. BLOCK
(OPTIONAL TYPE COMM.)

| 0 | A | A | A | A | A | 0 | 0 |

DATA BLOCK 1
OPTIONAL → MAIN BODY TRANSFER ADDR.

| 0 | T | T | T | T | T | T | T |

DATA BLOCK 2
EACH OPTIONAL IDENTIFICATION DATA

| 0 | x | x | x | x | x | x | x |

CHECKSUM DATA BLOCK

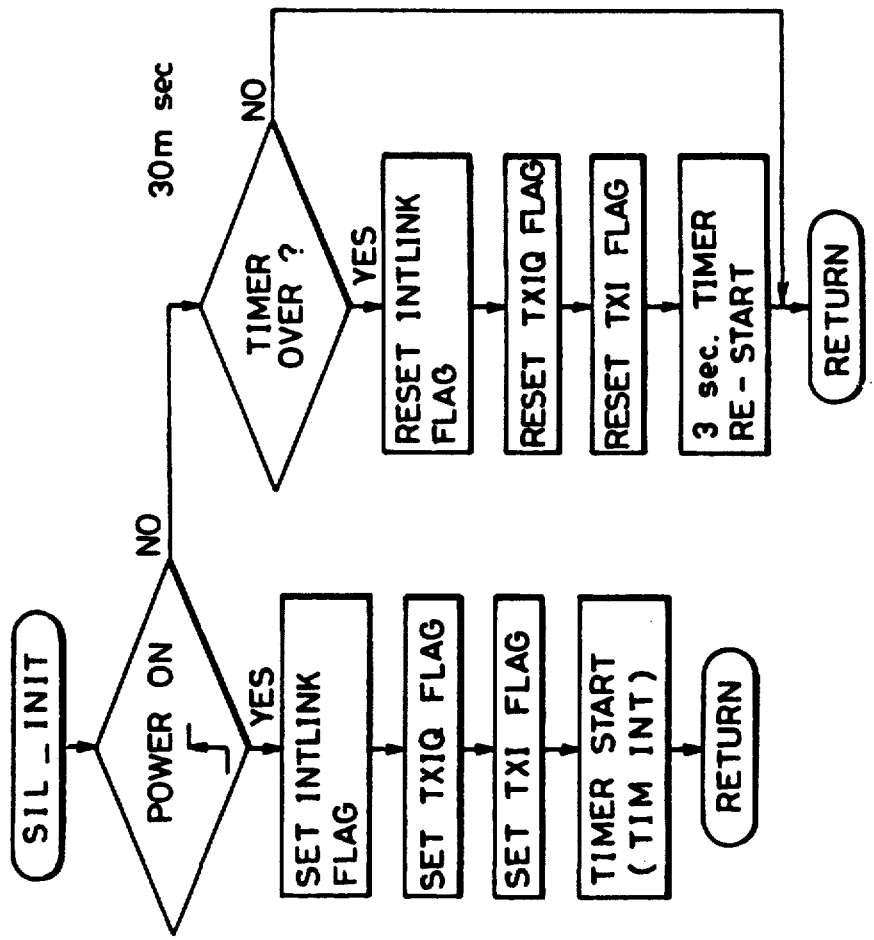

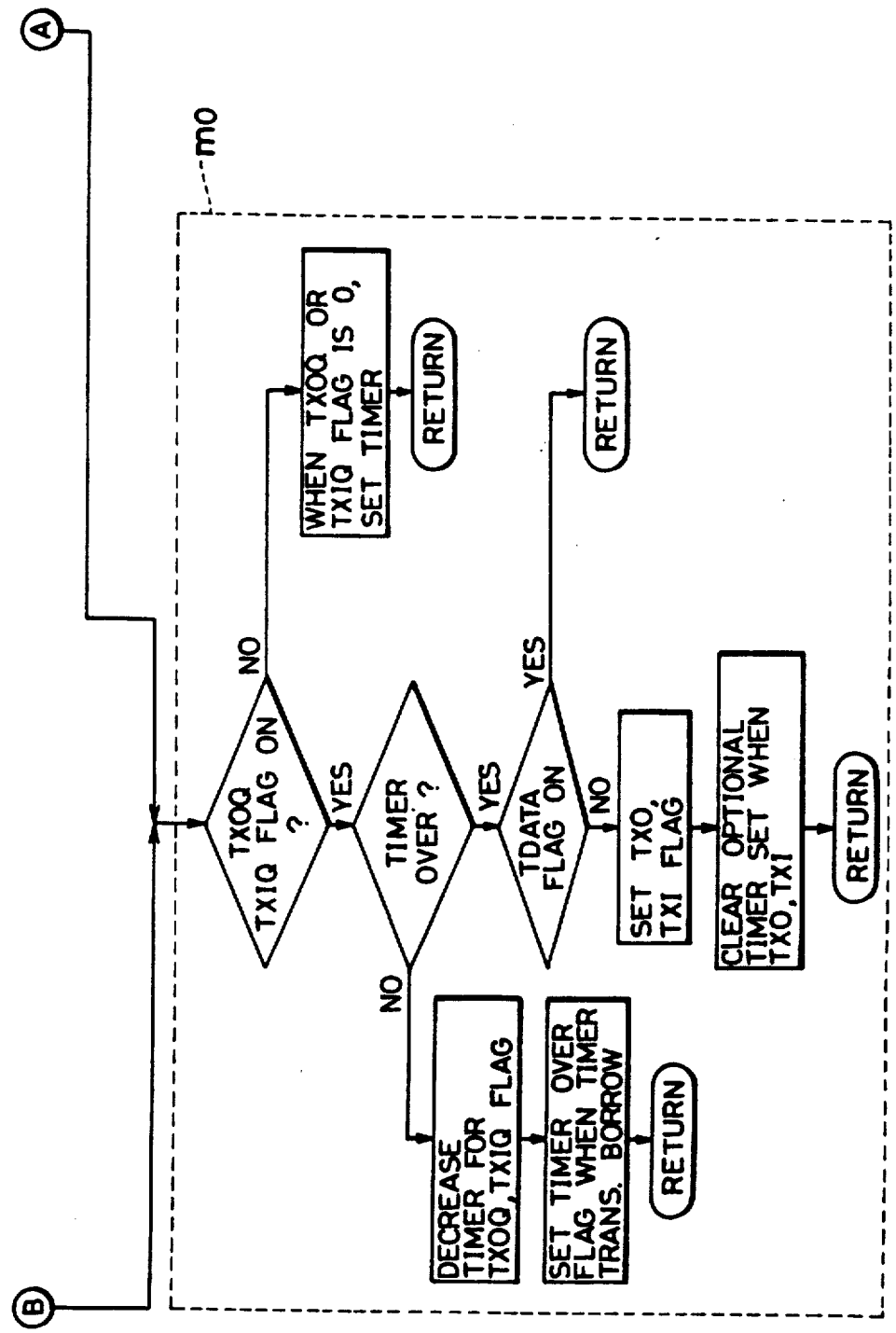

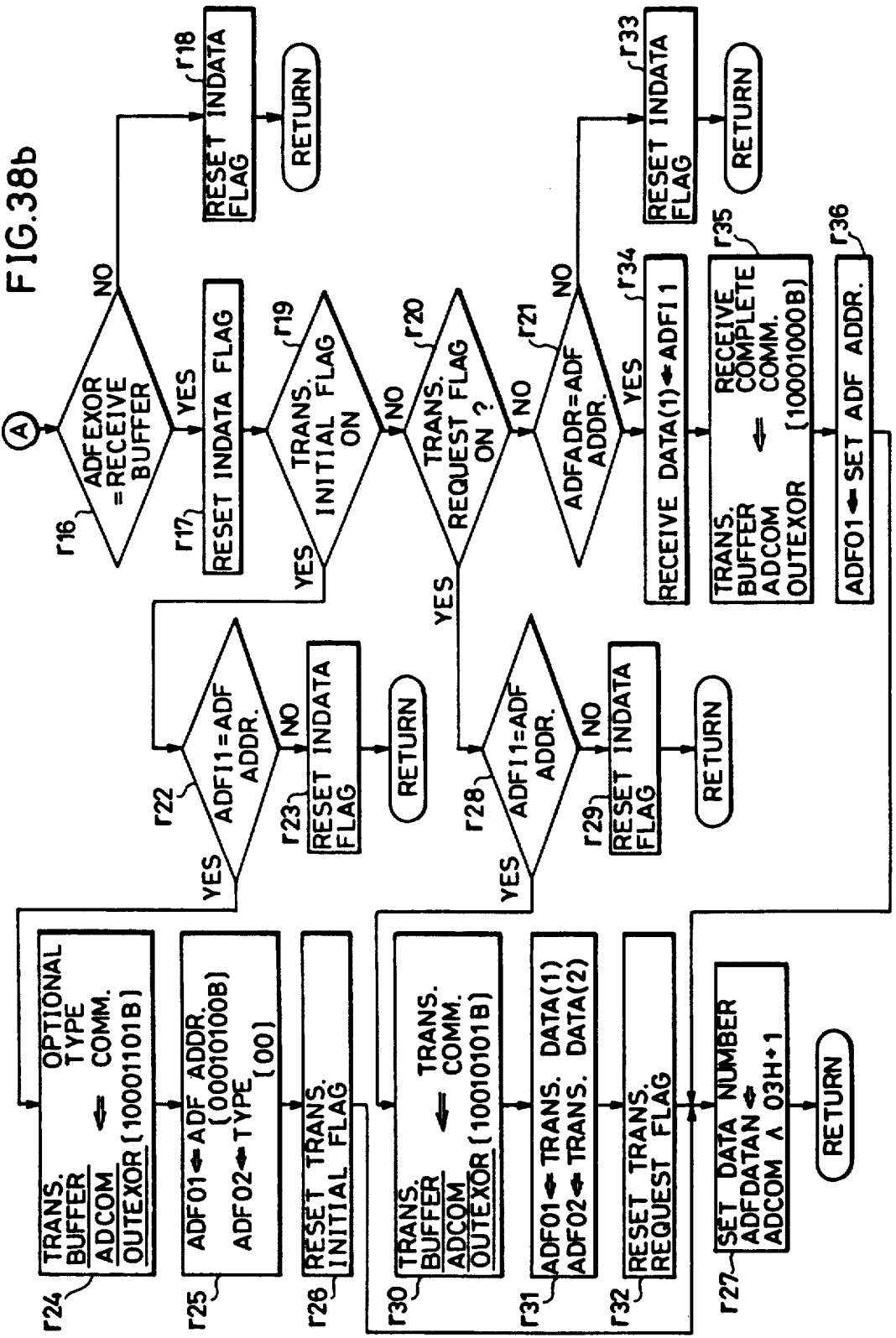

COPYING SYSTEM WITH A DUAL TRUNK SERIAL COMMUNICATION SYSTEM USING AN ACKNOWLEDGE LINE

This application is a continuation of application Ser. No. 262,552 filed Oct. 25, 1988, now abandoned.

BACKGROUND OF THE INVENTION AND RELATED ART STATEMENT

The present invention relates to a copying system comprising a copying machine main body and its peripheral equipment (optional devices) such as an ADF (automatic document feeder), a sorter, a special copying paper cassette and the like connected thereto, and more specifically to an interface system for transmitting data (signal) between the main body and the respective devices.

Interface systems between the copying machine main body and the respective devices include one signal for one line system, a parallel communication system, and a serial communication system.

Although the one signal for one line system permits a realtime response, it requires I/O ports and cables as many as the necessary number of signals As the optional devices have improved functions, the number of I/O ports are increased for transmitting a lot of data and a large load and many cables must be processed on the side of a main circuit with increasing cost Further, in order to permit many kinds of optional devices to be mounted on a single main body it is necessary that the main body device be provided with the required number of signal lines for optional devices in advance. However, when the optional devices are not mounted, terminals are not used, which reduces efficiency.

The parallel communication system can transmit, for example, 8 bits of data at a time for high speed data communication. However, since it requires at least eight transmission cables (lines) and I/O ports, a large load is imposed on the side of a main circuit and all of the respective lines must be protected against noise.

Although the serial communication system has a slow transmission speed because it transmits data through a single signal cable successively, it can transmit a lot of data using two communication cables and two I/O ports so that the device has advantages that a lesser load is imposed when cables and a main circuit are processed, expansion of an interface is improved, cost is reduced, and only two cables are necessary to be protected for the prevention of noise. However, to increase a transmission speed, a frequency of signals is necessary to be increased, which reduces resistance to noise so that an improved measure for cable noise is required In addition, malfunction due to a communication error or the like must be prevented by software of a CPU of a main body serving as a host.

Then, as shown, for example, in Japanese Unexamined Patent Publication No. 254060/1985, there is proposed a device wherein a sorter is connected to a copying machine main body on-line, the sorter applies a signal indicating its capacity to the main body, and a condition for creating an image is restricted on the side of the main body depending on the signal for preventing improper sorting. With a conventional device such as the example, since addresses and commands inherent in respective optional devices are not admitted. signal lines are necessary for each kind of an operation mode.

Further, as shown, for example, in Japanese Unexamined Patent Publication No. 63565/1985, the use of an adapter having a serial interface circuit and a parallel interface circuit is proposed for permitting devices of which interface (communication) system has different specifications to be connected. A system employing such an adapter, however, has difficulty in coping with an increase in the kinds of optional devices and an increase in their functions.

In addition, since a signal in the conventional interface systems is a dedicated signal for each optional device, a different kind of an optional device cannot be connected to a main body or it is necessary that a mode be modified by a dip switch or through simulation to employ the different kind of the device.

SUMMARY OF THE INVENTION

The present invention is related to an interface system for a copying system, wherein a frame of transmission data comprises an address block, a data block, and a checksum data block, an optional device corresponding to an address transmitted from a main body transfers data to the main body when received data coincides with checksum data determined based on the received data by the optional device, the transfer of the data is judged to have completed when the main body confirms that the transmission address coincides with the data transferred from the optional device, and the main body judges that an error occurs when the transferred data is not returned from the optional device or the aforesaid coincidence cannot be confirmed and then the main body transmits the data again. It is an object of the present invention to provide an interface system capable of improving reliability of communication in a serial communication system, correctly identifying various kinds of optional devices with a multi-function connected to a main body with a lesser number of cables, making an arrangement simple, advantageously reducing cost and increasing a data transmission speed.

BRIEF DESCRIPTION OF THE DRAWINGS

FIGS. 4, 5, 6, 7, 8, 9, 10, 11, 12, and 13 are diagrams illustrative of format arrangements of a frame of transmission data in the present interface system;

FIG. 14 is a diagram illustrative of a communication method of the present interface system;

FIGS. 15, 16, 17, 18, 19, 20, 21, 22, 23, 24, 25, 26, 27, and 28 are diagrams illustrative of concrete format arrangements for data transmission;

FIGS. 32, 33, 34, 35, 36a, 36b, 37a, 37b, 38a, 38b, 39a, 39b, and 40 are flowcharts of various kinds of programs.

DETAILED DESCRIPTION OF THE PREFERRED EMBODIMENTS OF THE INVENTION

Figure 1:
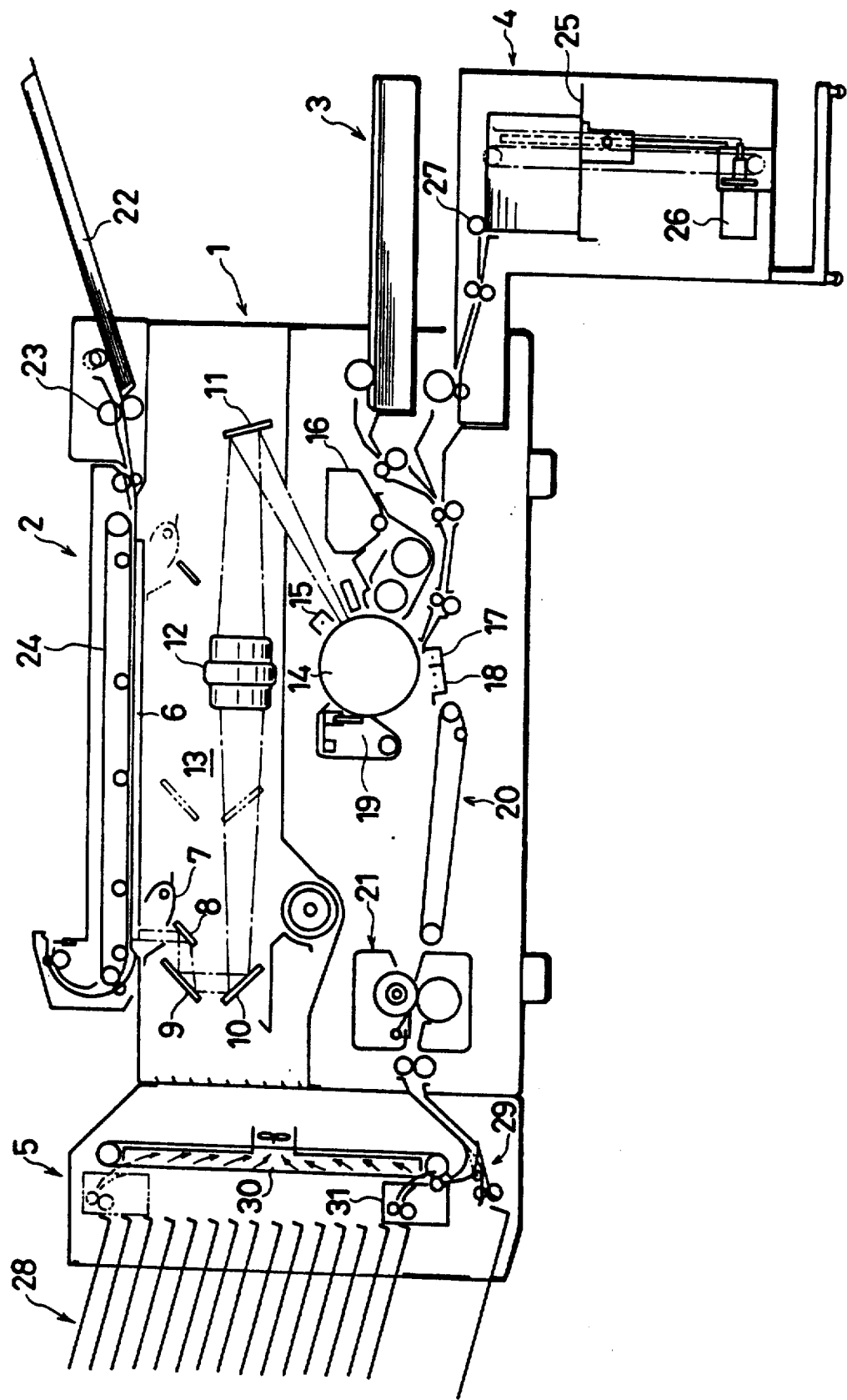
FIG. 1 is a diagram illustrative of an overall arrangement of a copying system to which an interface system according to the present invention is applied.

FIG. 1 shows an example an arrangement of a copying system to which an interface system according to the present invention is applied, wherein numeral 1 indicates a copying machine main body, numeral 2 indicates a so-called ADF (automatic document feeder) mounted on the main body 1 for automatically feeding documents, numeral 4 indicates a special copying paper cassette attached to a side of the main body in addition to a copying paper cassette 3 for feeding various kinds and a lot of papers and numeral 5 indicates a sorter having a number of bins (trays) and attached to the other side of the main body 1 for sorting and gathering copied papers The ADFs 2, the special copying paper cassettes 4 and the sorters 5 having various kinds of specifications are prepared as optional or auxiliary devices and desired ones are suitably selected from them to be attached to the main body 1. Control circuits of the respective optional devices are electrically connected to a control circuit of the main body so that data is transmitted therebetween and prescribed operation is effected as described below.

There are provided in the main body 1 an optical system 13 comprising an exposure lamp 7, mirrors 8, 9, 10, 11 and a lens assembly 12 for exposing and scanning a document placed on a contact glass 6, a photosensitive drum 14 to which an image of the document is irradiated by the optical system 13, peripheral devices around the photosensitive drum 14, such as a main charger 15, developing means 16, transferring means 17, separating means 18 and cleaning means 19, a paper feeding passage and feeding means 20, fixing means 21 and the like.

The ADF 2 comprises a tray 22 in which documents are set, document feeding rollers 23, a document feeding belt 24 and the like. The special copying paper cassette 4 comprises a lifting table 25 capable of moving upwardly and downwardly with copying papers placed thereon, a motor 26 for driving the lifting table 25 upwardly and downwardly, a copying paper feed roller 27 and the like. The sorter 5 comprises a number of bins 28, means 29 for switching copied paper discharging passages, a feed belt 30 for feeding copied papers in the state that they are adsorbed thereon by air sucked by a fan, means 31 capable of moving freely for feeding a copied paper into a prescribed bin 28 from a feed belt 30 and the like.

Figure 2:
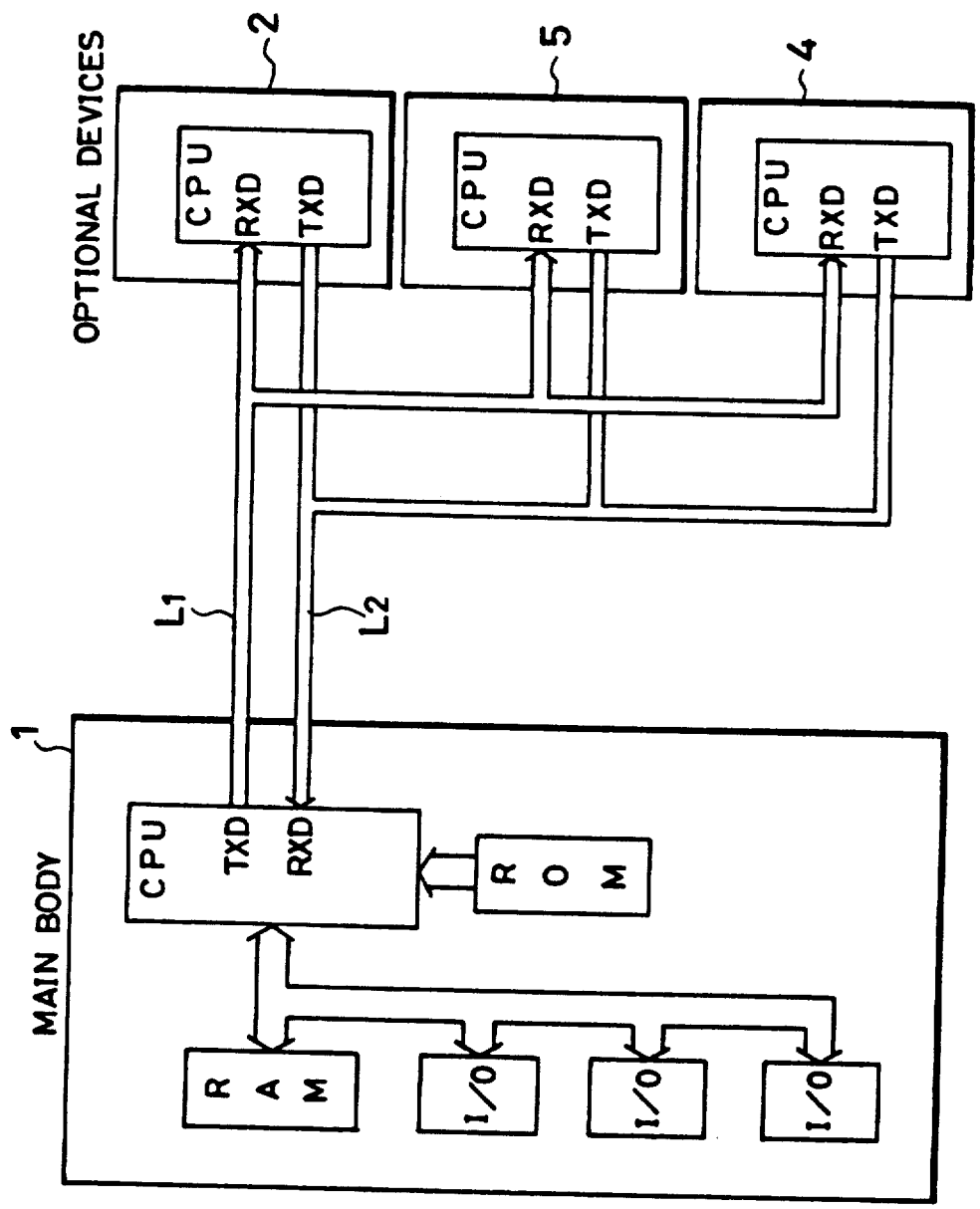
FIG. 2 is a block diagram of a control circuit in the copying system.

FIG. 2 shows the connection of control circuits of various kinds of optional devices to the copying machine main body 1, the respective optional devices 2, 4, 5 being connected to a CPU of the main body 1 through only two signal cables L1 and L2. More specifically, the signal cable L1 is connected from an output terminal TXD of the CPU of the main body 1 to input terminals RXD of CPUs of the respective optional devices and the signal cable L2 is connected from output terminals TXD of the CPUs of the respective optional devices to an input terminal RXD of the CPU of the main body 1, respectively. The present system has the feature that an interface system employing a serial communication described later transits data through the two cables L1 and L2 to control operation of the present system.

Incidentally, a so-called open collector circuit may be used as an interface specification for an input/output circuit for providing a fail-safe function for the abnormality of the devices and the circuits.

Figure 3:
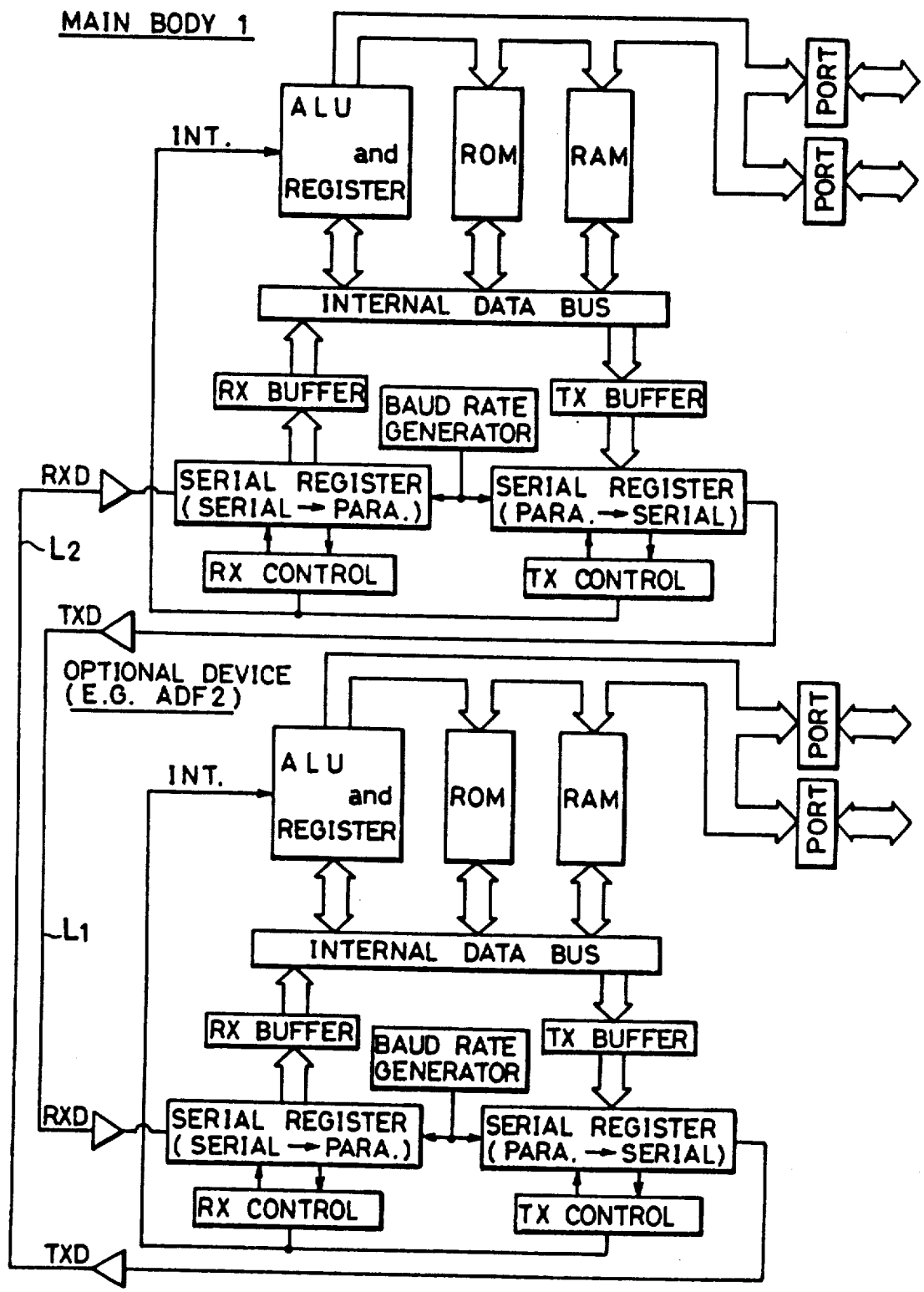
FIG. 3 is a functional block diagram of the circuit.

FIG. 3 shows functional blocks of the control circuits connected as described above The main body 1 and an optional device, e.g. the ADF 2 include an internal data bus, a TX buffer, an RX buffer, serial registers (parallel to serial and serial to parallel), a TX controller, an RX controller, a baud rate generator, and further a ROM, a RAM and the like in addition to an ALU and a register serving as a main unit of the CPU, respectively The aforesaid cables L1 and L2 connect one of the serial registers (parallel to serial) of a sending side with the other of the serial registers (serial to parallel) of a receiving side, respectively An arrangement is such that the serial registers feed (transmission or transfer) data (for example, for one byte) in the buffers to the signal cables in synchronism with a clock from the baud rate generators or fetch data from the signal cables, and when the buffers are empty or data is fed thereto the TX controller and the RX controller interrupt the ALU for effecting an interruption processing.

Formats of transmission data according to the present interface system will be described below with reference to FIG. 4 through FIG. 13.

FIG. 4 shows an arrangement of a frame of the transmission data and the frame comprises an address block, a data block succeeding it and a checksum data block further succeeding it. Each block is composed of 8 bits (D7–D0) and the data block includes the maximum of 4 bytes and the size of one frame is composed of the maximum of 6 bytes (48 bits).

FIG. 5 shows an arrangement for each bit of the respective blocks As shown in the drawing, an identifying element for identifying whether a block is the address block or a block other than the address block is provided with a section a, i.e., the seventh bit (D7) of the respective blocks. More specifically, when the identifying element is "1", it represents that the block is the address block (address data select bit) and when it is "0", it represents that the block is the data block or the checksum data block A section b (D6–D2) represents a command address or an optional address, a section d (D6–D0) represents a content of an actual data and a section e (D6–D0) represents checksum data.

FIGS. 6 and 7 show an arrangement of the address data block. As shown in the drawings, five bits from D6 to D2 in the address block represents various kinds of commands corresponding to the content of transmission data or the addresses of respective optional devices. Twenty nine kinds of bits represented by D6–D2 from "00100" (4) succeeding to "00011" (3) to "11111" (31) are used for the addresses of the respective optional devices. The bits in D1, D0 represent a number of data blocks succeeding the address block More specifically, "00" indicates that a single data block succeeds to the address block and "01" indicates that two data blocks succeed the address block.

Figure 8:
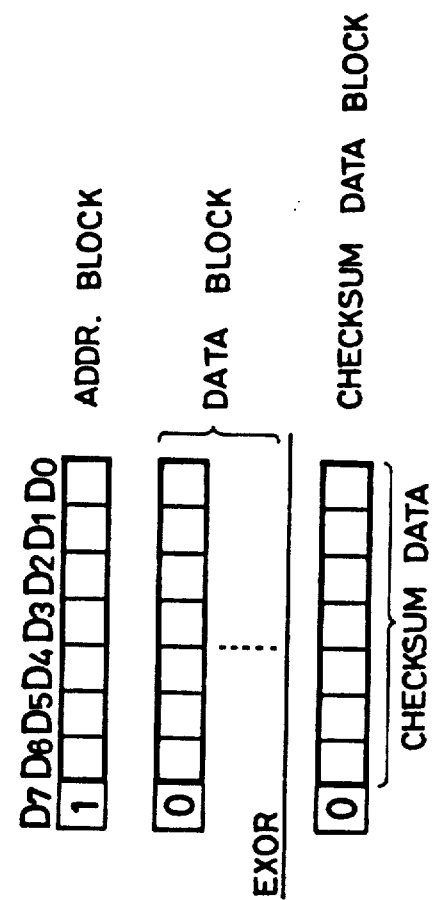

FIG. 8 shows how to determine the checksum data block. The block is determined by effecting arithmetical operations such as the exclusive OR (EXOR) or the like for all of the address blocks and the data blocks However, the EXOR is not performed for the seventh bit (D7) in the respective blocks and it is made equal to "0" for the convenience of a following discrimination processing.

Next, a transmission/receive command will be described with reference to FIG. 9 through FIG. 13

FIG. 9 shows a transmission request command. As shown in the drawing, the command is owned only by the main body and a frame is composed of three bytes. A transmission request command address is put on D6–D2 of an address block and an address of a transmission requested side is put on D6–D2 of a data block. The command is sent by the CPU of the main body with the address of each optional device designated when it needs data from the device and the optional device designated by the address of the requested side sends data immediately. When a receive complete command is not transferred from the optional device within a prescribed period of time after the command has been sent from the main body, the main body sends the command again Such a handshaking prevents transmission errors and interference.

FIG. 10 shows a transmission initial command. Similarly to the aforesaid transmission request command, the command is owned only by the main body and a frame is composed of three bytes A transmission initial command address is put on an address block and an address of transmitted side is put on a data block The command is transmitted to respective designated addresses when a main switch of the main body is turned on to confirm that the respective optional devices are connected. The connection is confirmed by receiving an optional type command from the optional device after the transmission has been effected from the main body to initiate transmission with the optional device. When the copying machine main body is not in copying operation, the command is transmitted to the respective optional devices successively at an interval of 3 seconds for confirming the connection of the respective optional devices at a prescribed cycle. The confirmation of the connection thus carried out eliminates the need for a conventional dip switch and simulation FIG. 11 shows a receive complete command. The command is owned only by the optional devices and a frame is composed of three bytes. A receive complete command address is put on an address block and an optional device transmitting the command puts its address on a data block. The command is transferred from the optional device to the main body with its address put thereon when checksum data in data transmitted from the main body coincides with checksum data in the data received by the optional device. The main body judges that the transfer of the command has completed when an address of the side to which the command is transferred corresponds to an address transferred to the main body.

FIG. 12 shows an optional type command The command is owned only by the optional devices As shown in the drawing, a frame is composed of four bytes. An optional type command address is put on an address block. A data block is transmitted by two bytes. A data block 1 indicates an address for effecting transmission from an optional device to the main body and a data block 2 indicates a type (for example, identification of a type such as 10 bins, 20 bins or the number of copied paper sorted per 1 bin in the case of a sorter) of the optional device The command is transferred to the main body by the optional device which has received a transmission initial command from the main body together with identifying data of the type of the optional device added thereto When the command is received by the main body, it is judged that the main body is connected to the optional device.

Figures 13, 14:
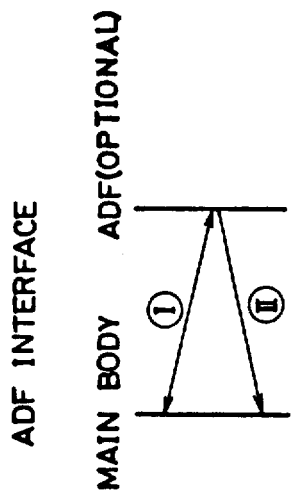

FIG. 13 shows an example of addresses of various kinds of optional devices. The address is designated by twenty eight kinds of 5 bits represented by D6–D2 of the address block, i.e., "00100" to "11111" because bits "00000" to "00011" are used for designating the transmission/receive command.

Next, a usual procedure for data transmission will be described. FIG. 14 shows an ADF interface. The main body transmits data to the ADF (I) and if there is no error in the data received by the ADF, the ADF transfers a receive complete command (II). If there is no error in the command received by the main body, the data transmission is completed. If no receive complete command is returned or the command is an error, the main body transmits the data again.

FIG. 15 shows a frame of data transmission (1) from the main body to the ADF and FIG. 16 shows a frame of the transfer of a receive complete command (II) from the ADF. In the data transmission (I), a data block is provided with the bits of the contents of various kinds of actual data as shown in the drawing, wherein ADF,ST represents bits of a start of the ADF, M.SOURCE represents a bits of power application to a device, CHANGE represents bits of a document change, and CLEAR represents bits of a clear of a set value or the like, respectively.

When the main body requests data from the ADF, the main body transmits a transmission request command to the ADF (I) and the the ADF transfers data to the main body on the receipt of the transmission request command (II). When the ADF judges that the transmission from the main body is an error, the main body transmits the transmission request command again based on its judgment because the transfer to the main body (II) is not effected When the transfer (II) is an error, the main body transmits the transmission request command again.

FIG. 17 shows a transmission format when the main body requests transmission to the ADF and FIG. 18 shows a transfer format when the ADF transfers data to the main body. CHIME in a data block 1 represents bits of a chime used when a document remains without being removed by mistake, ADF NEXT represents bits of next document feed, ADF ON represents bits of document set, PRINT represents bits of a copy command, a JAM ADF represents bits of an ADF jam and an ORIGINAL SIZE DATA represents bits of document size data, respectively.

Next, a sorter interface will be described. Its system for data transmission is the same as that described with reference to FIG. 14. FIG. 19 shows a format of data transmission from the main body to the sorter (I) and FIG. 20 shows a format of a receive complete command transfer from the sorter (II), respectively. In data blocks 1, 2, INT represents bits of interruption, GROUP represents bits of grouping of papers, SORT represents bits of sorting, N.SORT represents bits of not sorting, a COPY represents bits of copying, KEYSET represents bits of input key setting, and FINAL represents bits of end FIG. 21 shows a format of a data request from the main body to a sorter (I) and FIG. 22 shows a format of data transfer from the sorter to the main body (II). The description of them is omitted because the detail of them is the same as the aforesaid one.

Next, an interface of a special copying paper cassette (ST) will be described. The data transmission of it is the same as the aforesaid one. FIG. 23 shows a format when data is transmitted from the main body to the ST (I) and FIG. 24 shows a format when a receive complete command is transferred from the ST (II).

FIG. 25 shows a format of transmission for the main body to request data to the ST (I) and FIG. 26 shows a format when data is transferred from the sorter to the main body (II), respectively.

Next, how to confirm the connection of optional devices will be described. In the case, the main body transmits transmission initial commands to the respective optional devices (I) and the optional devices transfer optional type commands to the main body (II) when they confirm the commands The optional type command includes data for confirming the commection and for identifying the types of the optional devices. FIG. 27 shows a transmission initial command from the main body to the optional device (I) and FIG. 28 shows an optional type command from the optional devices to the main body (II).

Next, operation of the interface system according to the present invention will be described with reference to flowcharts shown in FIG. 29 through FIG. 40.

Figure 29:
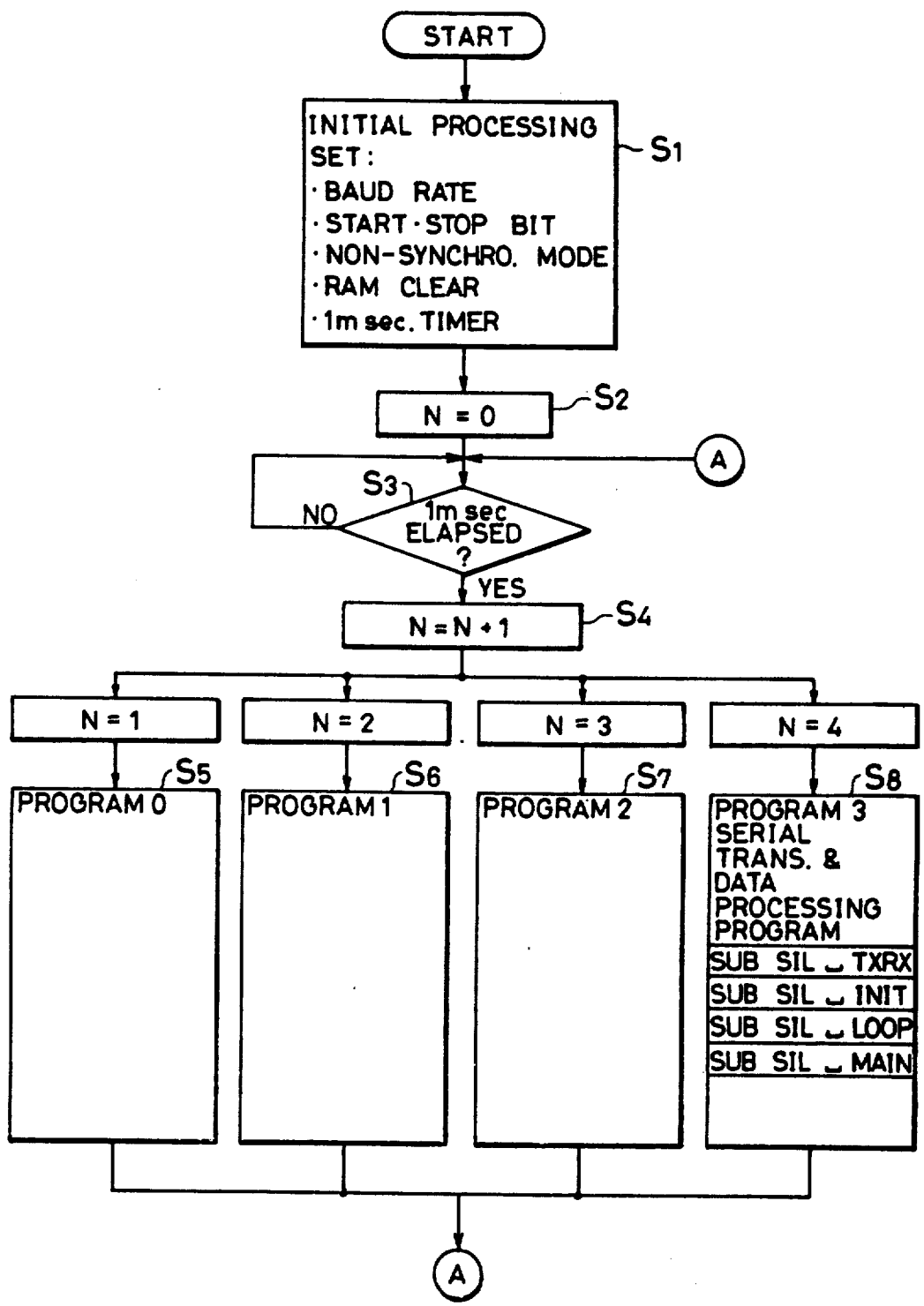
FIG. 29 is a flowchart of a main program according to the present interface system.

FIG. 29 shows an overall flowchart, wherein respective programs 0, 1, 2, 3 are such that they are executed once every 4 milliseconds. More specifically, a baud rate, start and stop bits, a non-synchronism mode, a RAM clear and a one millisecond timer are set in a step S1 as an initial processing, a counter N is set to 0 in a step S2, and the counter N is incremented by 1 every time the timer counts 1 millisecond and the respective programs 0, 1, 2, 3 are executed when N=1, 2, 3, 4 in steps S3–S8. The programs 0, 1, 2 are prescribed programs necessary for the main body and the optional devices to effect copying operation and their detailed description is omitted here.

The program 3 executes a serial transmission and data processing programs of the present system in step S8. The program 3 includes repsective subroutines, a SERIAL-TX,RX (transmission/receive), a SERIAL-INIT (initial), a SERIAL-LOOP (loop) and a SERIAL-MAIN (main), which will be described later in detail.

Figure 30:
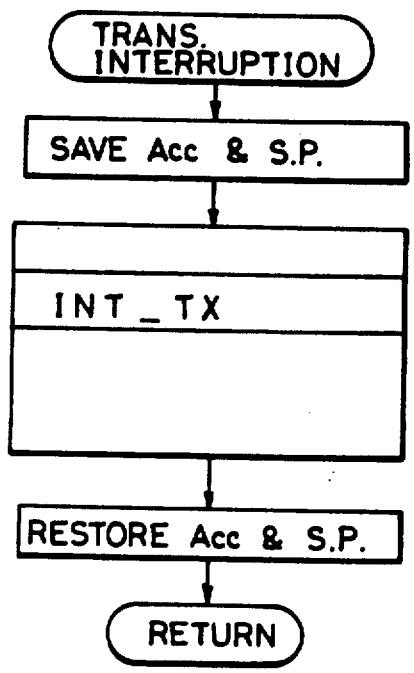
FIGS. 30 and 31 are flowcharts of interruption processing programs.
Figure 31:
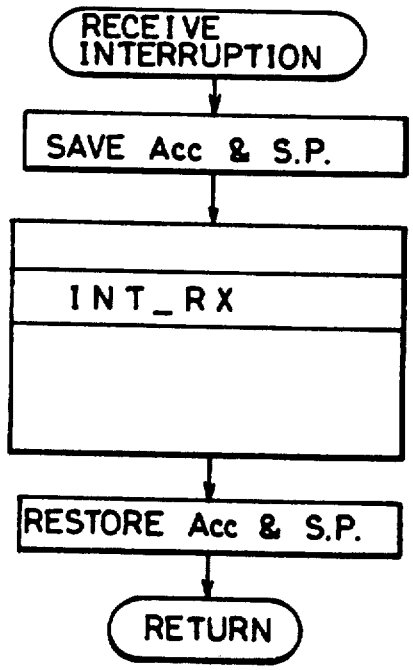

FIG. 30 and FIG. 31 show processing routines for an interrupt in transmission and, an interrupt in receive. As described above, the former interrupt is executed when a transmission (TX) buffer is empty and the latter interupt is executed when data is applied to a recieve (RX) buffer. When the interupts are completed, an original location of the flowchart in FIG. 29 is restored again. In the interrupt routines, data in an accumulator ACC, a stack pointer SP or the like is temporarily saved prior to the steps of interupts (INT) TX, RX to prevent the confusion of the data and the data is restored into its original location after the completion of the steps. The steps INT-TX and INT-RX will also be described later.

Figure 32:
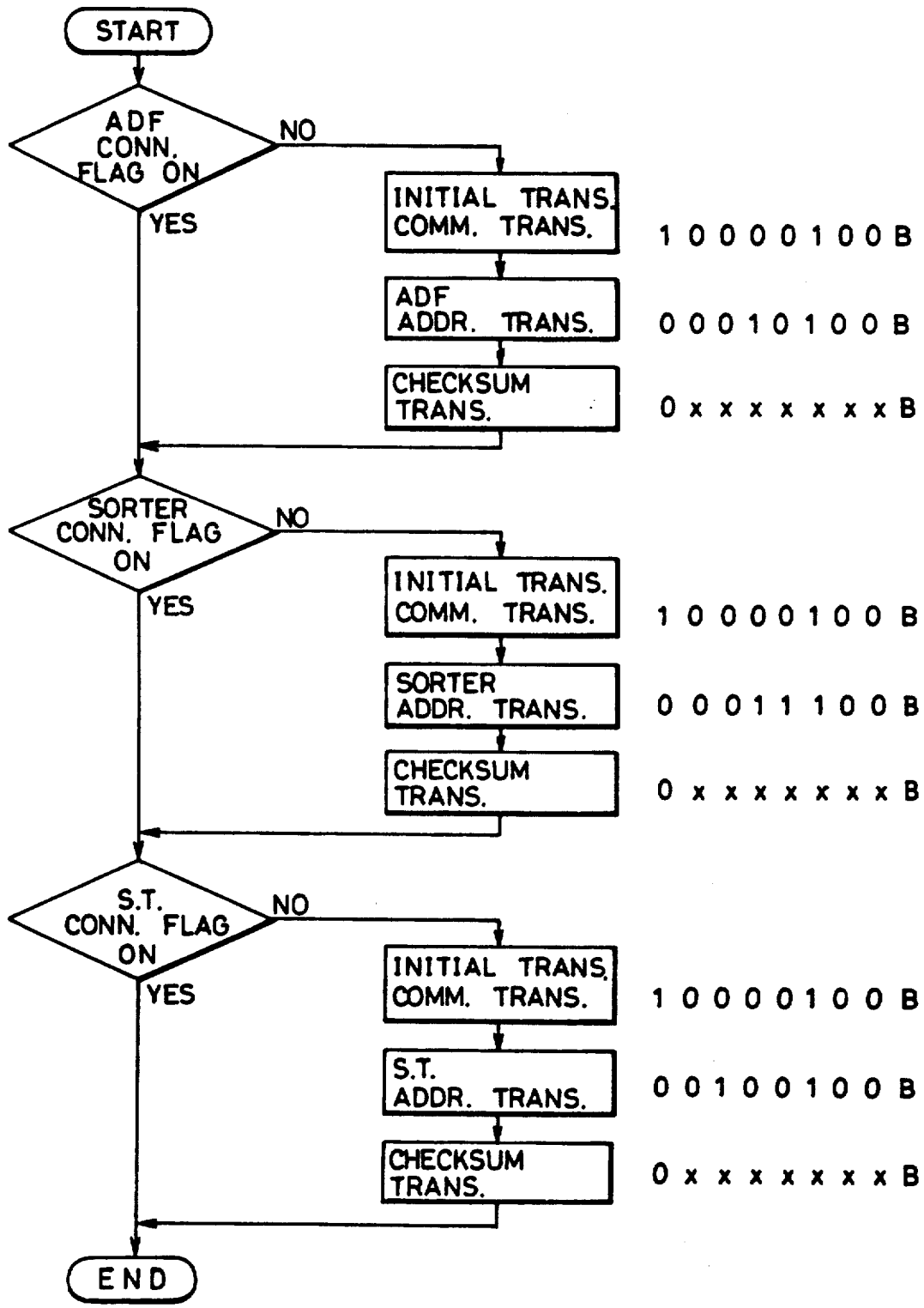

FIG. 32 shows a concept of command transmission to confirm the connection of the respective devices in an initial routine of the aforesaid program 3, wherein it is determined whether connection flags of the ADF, the sorter and the special copying paper cassette are ON, and if they are not ON, an initial transmission command, an address and a checksum are transmitted, respectively.

Flags used in flowcharts shown in FIG. 33 and drawings following it are listed and described as follows.

Flags on the Main Body (PPC) Side

OPN : transmission sequence flag at 8 millisecond interval.
TXOQ : flag for confirming transmission to respective optional devices.
TXIQ : confirmation flag for requesting transmission from respective optional devices.
TXO: flag indicating that transmission is being effected to respective optional devices (flag to be set while transmission is being effected or when no transmission is effected).
TXI : flag indicating that transmission is being effected from respective optional devices (flag to be set while transmission is being effected or when no transmission is effected).
LINK : flag to be set when optional devices are connected for checking whether the optional devices are connected (when the flag is set once, it remains set until a next check is effected).
INTLINK: flag to be set for checking the presence of optional devices and their types.
TDATA : flag indicating that a data frame is being transmitted.
TXDATA 1–4 : area where data frame which is being transmitted at present is stored.
DATA-TX-N : data indicating a location (location to which transmission is effected) of transmission data (data frame) (1 is subtracted every time transmission is effected and the calculation is completed when $\phi$FFH is obtained, the number of data +1 is set at first).
TXEXOR : obtained by processing an address and data by exclusive OR (however, the seventh bit is 0).
ADRS : data area where received addresses or commands are saved temporarily.
DATA 1–4 : data area where received data is saved temporarily.
EXOR : data area where successively exclusive OR-processed received data are stored.
FROM ADF (1)–(2) : completely received data (data confirmed to include no noise).
OPTYPE : flag indicating that an optional type command is sent.

Flag on the Optional Device (eg, ADF) Side

ADFDATAN : data area indicating the number of data entered.
ADFEXOR : data area where exclusive OR-processed entered data are stored.
INDATA : flag to be set when an address or a command is judged to be related to a particular optional device.
ADF 1–4 : data area where entering data is saved temporarily.
ADCOM : area where entered address data or command data is saved.
ADF 01–4 : transmission data buffer.
OUTTEXOR : data area getting the exclusive OR of transmission data.

Figure 33:
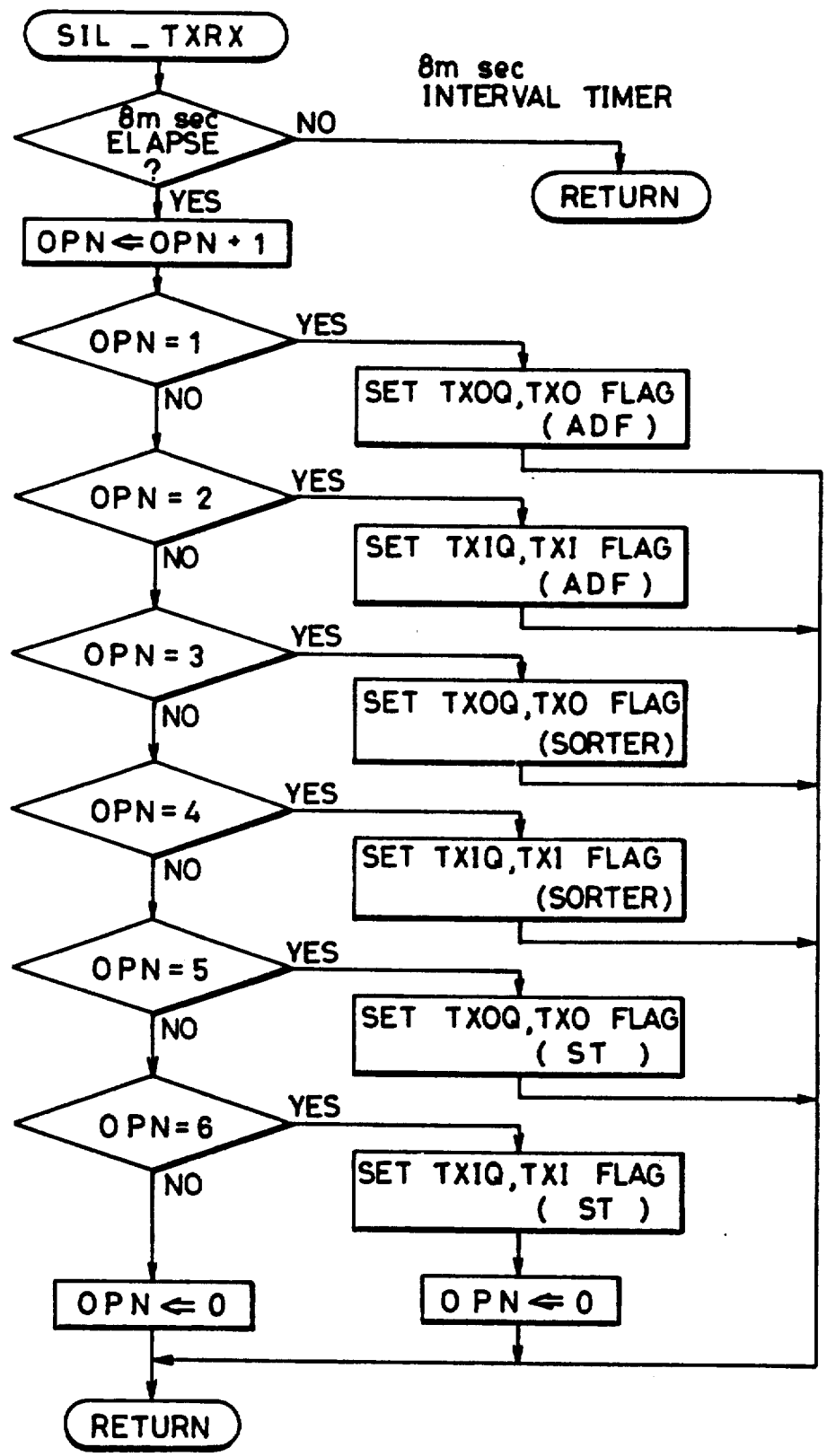

FIG. 33 shows a flowchart of a serial TXRX and the flowchart is executed by an eight milliseconds interval timer every 8 milliseconds.

The transmission sequence flag OPN is incremented by +1 every time the flowchart in the drawing is executed once. At first, when the OPN is 1, the respective flags TXOQ and the TXO for the ADF are turned ON, then when the OPN is 2, the respective flags TXIQ and the TXI for the ADF are turned ON. Likewise, the respective flags of the sorter and the ST are turned on after that FIG. 34 is a flowchart of a serial-initial program for checking whether optional devices are connected when power is applied for a prescribed period of time (30 milliseconds). FIG. 35 shows a flowchart of a serial-loop program for effecting the same checking every 3 seconds when power is applied as well as when copying is being effected. The program causes the flags INT-LINK, TXIQ, TX1 of the respective optional devices to be set every 3 seconds pass to start a timer and at the time when 30 milliseconds pass, the flags are reset to start a three second timer.

Figure 36A:
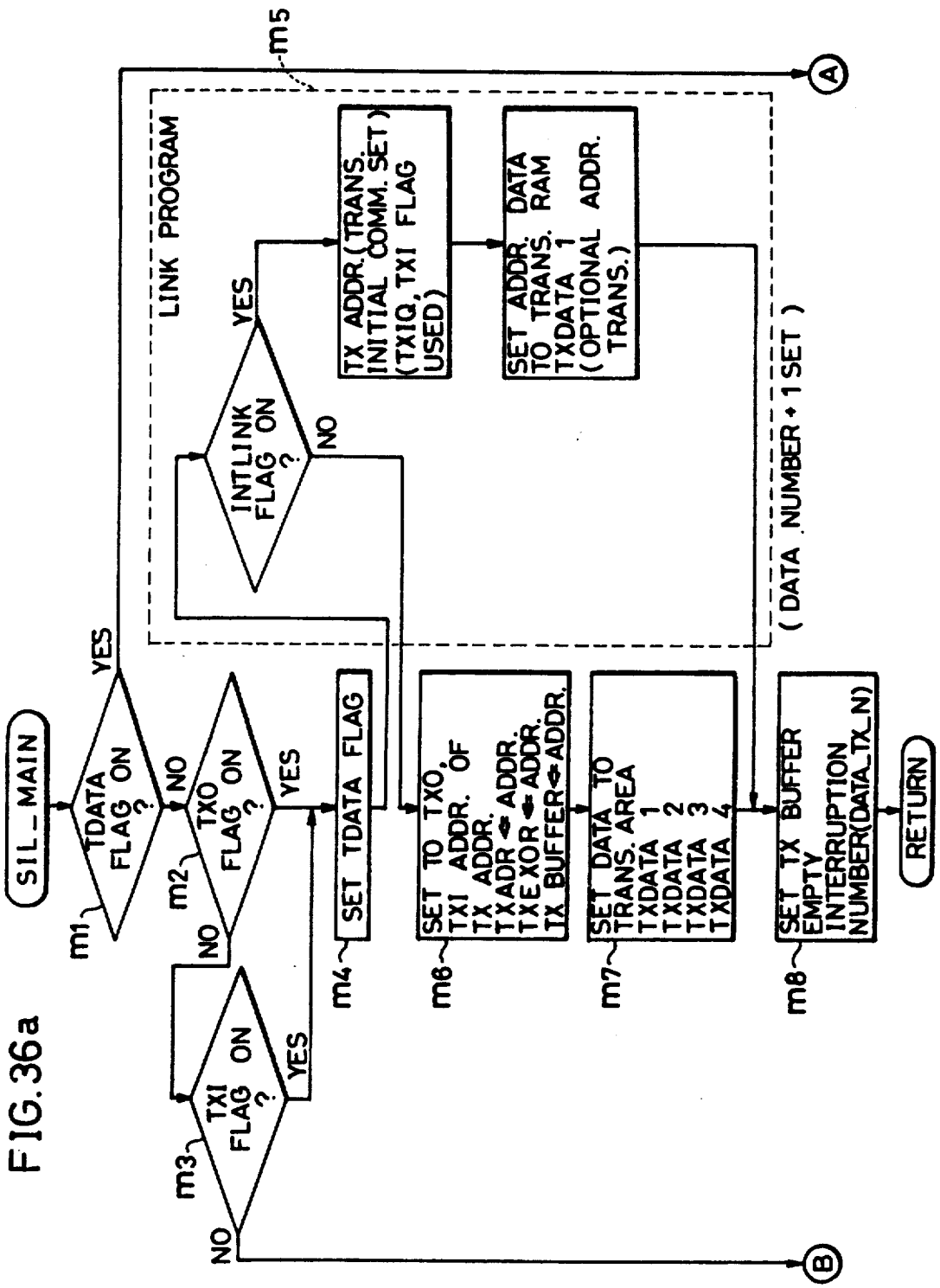

FIGS. 36a, 36b show a flow chart of a serial-main program for checking the respective flags TXO, TXI to store transmission data in the transmission area (TXDATA). Incidentally, transmission addresses or commands are transferred to respective transmission buffers. More specifically, whether the flag TDATA and the flags TXO, TXI are ON is checked and when the flags TXO, TXI are ON, the flag TDATA is set in steps m1 through m4. Next, an address for the TX is set and data is set to a transmission RAM area (transmission buffer) in steps m6-m8 through step m5 of a link program for checking whether the main body is connected with the optional devices. The data is transmitted to the optional device side by the serial transmission and when the transmission buffer empties data in it, an interrupt is executed to set the number of TX buffer empty interrupts (the number of data +1) to a DATA-TX-N (counter).

Incidentally, the transmission initial command shown in FIG. 10 and described above is set in step m6 in concrete terms, "00010000" is set as a TXDATA1 in step m7 and "00000001" is set in the DATA-TX-N.

When the flag TXOQ and the flag TXIQ remain ON, the flag TDATA is not ON and the flags TXO, TXI are not ON and the like, it is judged that a receiving error occurs in the optional devices or in the main body and a program for effecting transmission again from the main body is executed in step m0.

Figure 37A:
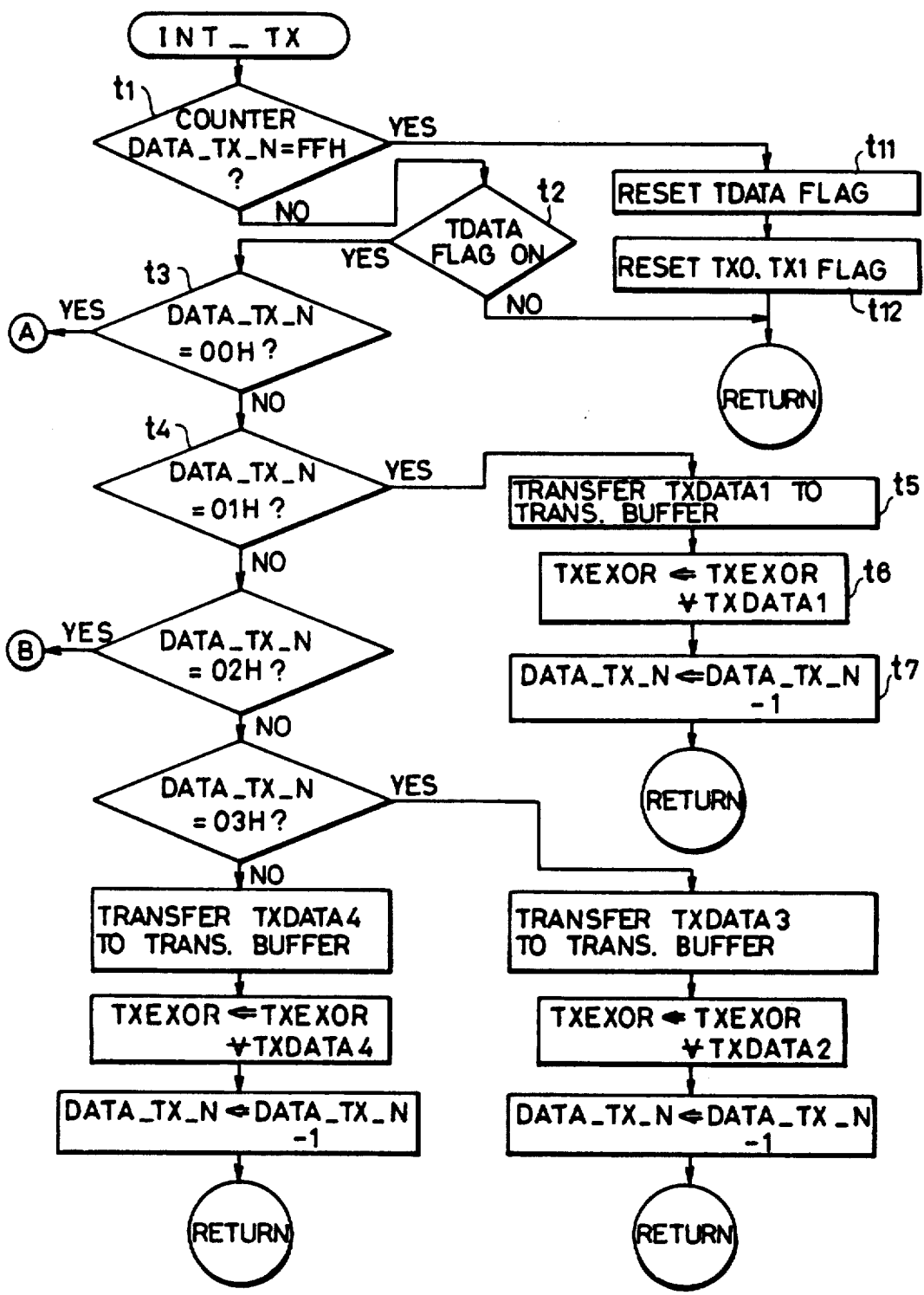
Figure 37B:
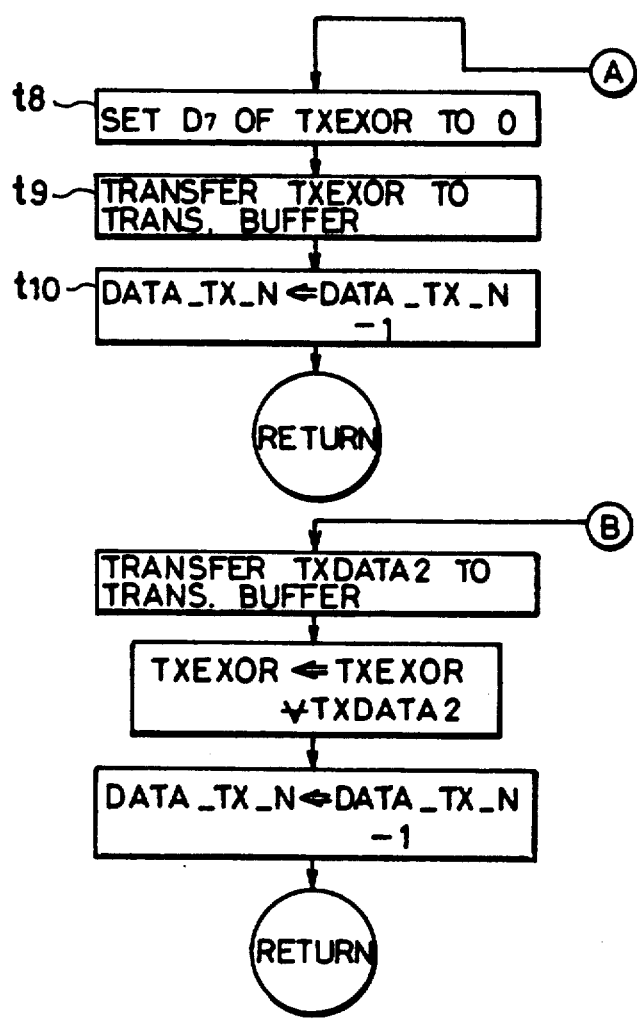

When the TX buffer is empty (when the transmission terminates), an interrupt is executed and the interrupt program described with reference to FIG. 30 is executed. FIGS. 37a, 37b show a concrete example of the interrupt TX program. The program causes data in the TX data area to be entered into the transmission buffer according to the information of the DATA-TX-N. More specifically, in FIGS. 37a, 37b, if the counter DATA-TX-N is not FF (H (hexadecimal)) in a step t1, the flag TDATA is checked in step t2 and whether the DATA-TX-N is 00 (H) is checked in step t3. If the DATA-TX-N is not 00 (H), whether it is 01(H) is checked in step t4. If it is YES in step t4, the TXDATA1 "00010000" is transferred to the transmission buffer, a TXEXOR getting EXOR of the address and the TXDATA1 is determined and "10010100", the DATA-TX-N is decremented by 1 (00H) to leave from the interrupt (RETURN).

If step t3 is YES in the next interrupt processing, the seventh bit of the TXEXOR is set to 0, the TXEXOR is transferred to the transmission buffer and the DATA-TX-N is decremented by 1 (FFH) in steps t8-t10 to leave from the interrupt. Further, if step t1 is YES in the next interrupt processing, the flag TDATA and the flags TXO, TXI are reset in steps t11-t12 to leave from the interrupt. Although the above description refers to a case having one data, the same flowchart is repeated in a case having two, three, or four data.

Figure 38A:
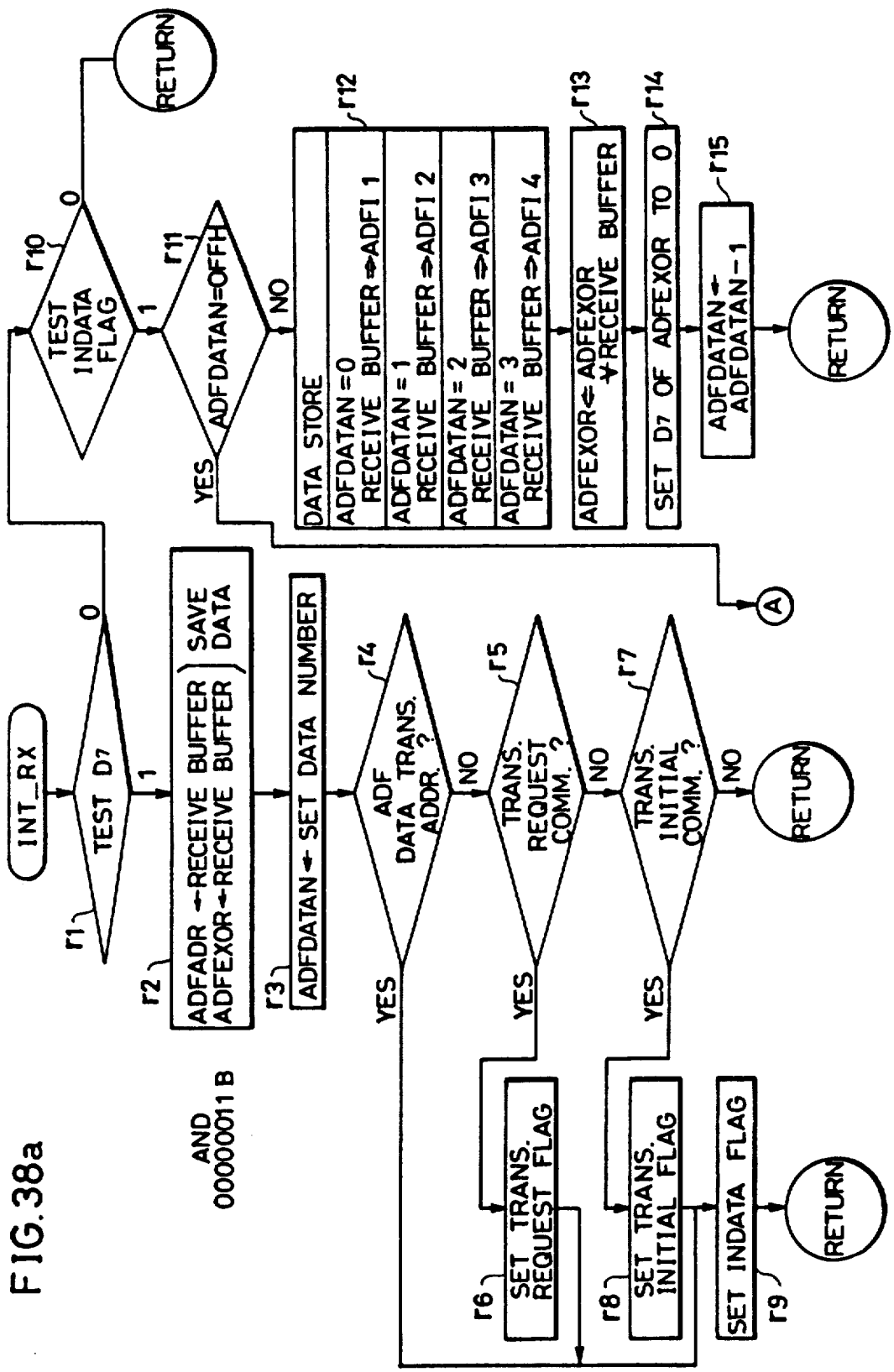
Figure 39A:
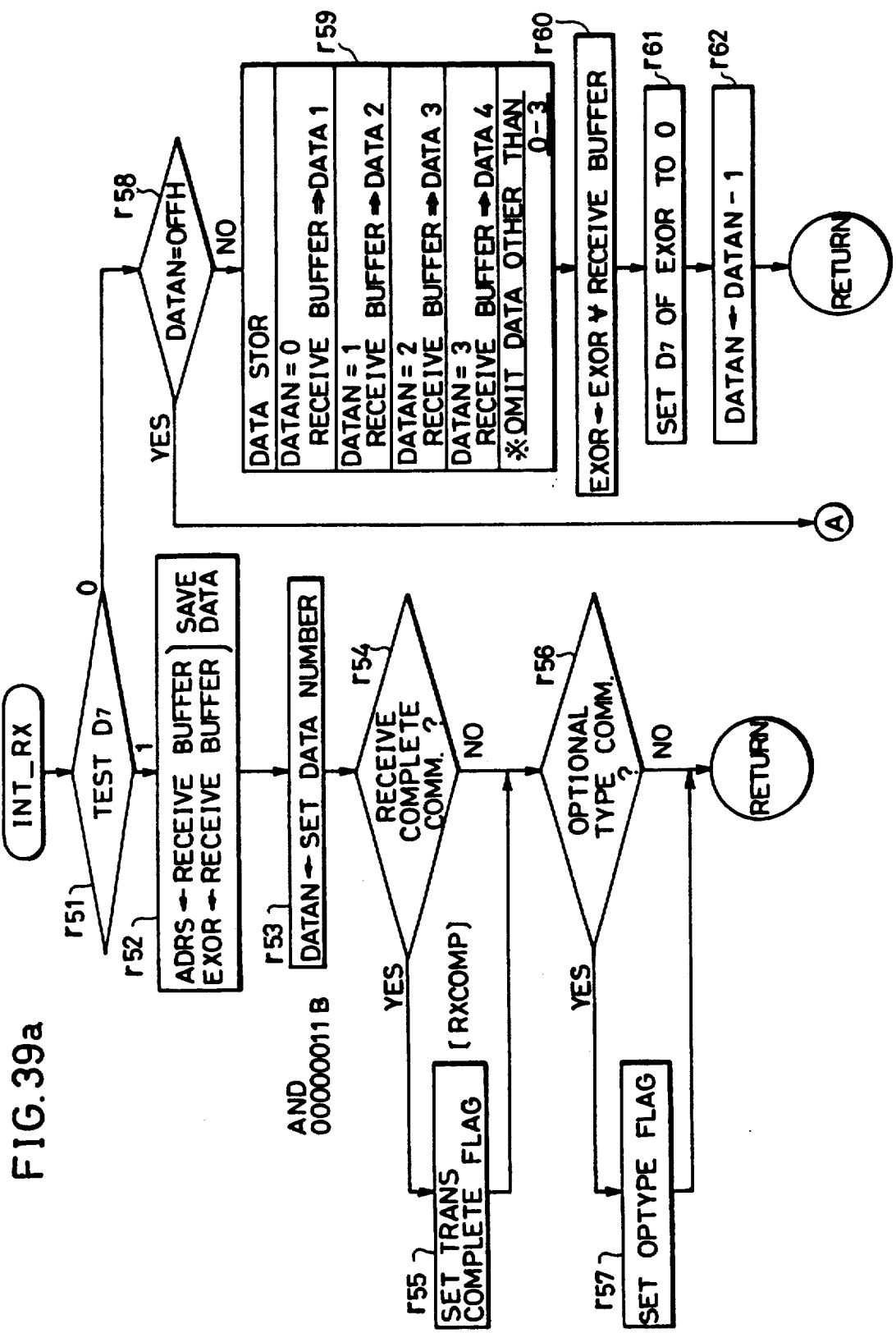
Figure 39B:
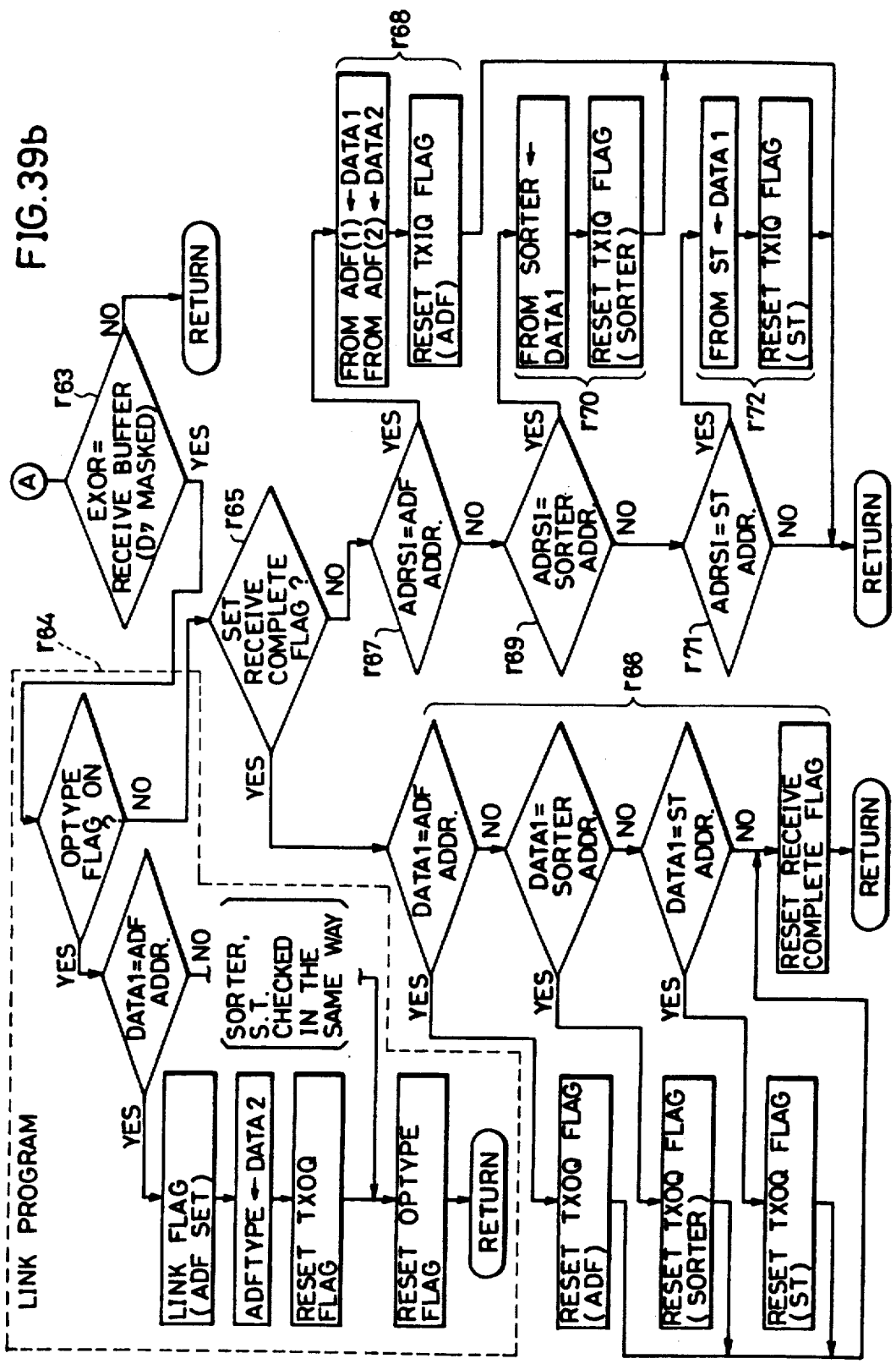

The aforesaid is a description about the interrupt processing on the main body side Next, an input interrupt program on the optional device side will be described. The program is the aforesaid interrupt program described with reference to FIG. 31, of which a concrete example is shown in FIGS. 38a, 38b.

In a program INT-RX shown in the drawing, the seventh bit is tested in step r1 first If it is "1", data is judged to be the address block so that data in the receiving buffer is saved, the number of data is set to the ADFDATAN, it is discriminated whether &he address block represents an ADF data transmission address, a transmission request command or a transmission initial command, a corresponding flag is set, and the flag INDATA is set in steps r2-r9 to leave from the interrupt.

Successively, when the seventh bit is "0" in step r1 in the next interrupt processing, the data is judged to be a data block or a checksum data block and the following processings are executed in step r10 and steps succeeding it. First, it is checked whether the flag INDATA is ON in step r10. When it is "1", it is checked whether the ADFDATAN is OFF (H) in step r11. When it is not OFF (H), data in respective receiving buffers is stored in data areas ADFI1 and the like, the receiving buffer data is processed by exclusive OR and the ADFDATAN is decremented by 1 in steps r12-r15 to leave from the interrupt.

When step r11 is YES in the next interrupt processing, it is confirmed whether the ADFEXOR coincides with the data in the receiving buffers in step r16. When it is YES, the flag INDATA is reset in step r17 and the processing goes to step r19 and steps succeeding to it. When it is NO, the flag INDATA is reset in step r18 and it is judged to be an error to leave from the interrupt.

It is checked whether a transmission initial flag is ON, a transmission request flag is ON and an ADFADR is an ADF address in the steps r19-r21. When the transmission initial flag is ON, it is confirmed in step r22 whether the ADFI1 is an ADF address. When it is not the ADF address, the INDATA flag is reset in step 23 to determine that it is a transmission error to leave from the interrupt. If it is the ADF address, steps r24 through r26 and step r27 are executed to return the data to the main body. More specifically, an address block of an optional type command as shown in FIG. 12 is transferred to a transmission buffer, an ADCOM and an OUTEXOR, then an ADF address and a type as a data block are transferred to ADFs 01 and 02, respectively, a transmission initial flag is reset and the number of the data is set to the ADFDATAN.

When the transmission request flag is ON, steps r28 through r32 and step r27 are executed as described above. More specifically, if the ADFI1 is an ADF address of it, the data transmission (II) as shown in FIG. 18 is executed in steps r30 and r31.

When data of the ADFADR is the ADF address, steps r33 through r36 and step r27 are executed in the substantially same manner as the aforesaid one. More specifically, when the ADFI is the ADF address of it, a receive complete command (II) as shown in FIG. 16 is transferred to the transmission buffer or the like in steps r35 and r36.

The aforesaid description refers to an interrupt processing on the side of optional devices (the aforesaid is an example of the ADF). When the main body receives the data processed as described above and transferred from the optional device, an interrupt processing is executed according to an INT-RX program shown in FIGS. 39a, 39b. The program checks noise and commands.

Since the program is basically the same as that described above with reference to FIGS. 38a, 38b, it will be described simply to avoid repeating the same description. The seventh bit is checked in a step r51 to determine whether transferred data is a command, an address, or data. When the seventh bit is "1", steps r52 through r57 are executed. When the data is a receive complete command, a receive complete flag is set, and when the data is an option timer command, an OPTYPE flag is set to leave from the interrupt. When the seventh bit is "0" in the next interrupt processing, a flowchart including step r58 and steps succeeding to it is executed More specifically, when a DATAN is not OFF (H), the data is stored, the EXOR of it is obtained, the seventh bit of the EXOR is set to 0, the DATAN is decremented by 1 in step r59–r62 to leave from the interrupt. When the DATAN is OFF (H), it is confirmed in step r63 whether the EXOR coincides with a receiving buffer. When the EXOR does not coincide with it, it is determined that a transmission error occurs to leave from the interrupt. When the EXOR coincides with it, a LINK program in step r64 is executed. When an OPTYPE flag is ON, the data transferred from the optional device side is fetched to the main body side and a TXOQ flag and the OPTYPE flag are reset as the data has been transferred to leave from the interrupt. When the OPTYPE flag is not ON, it is checked in step r65 whether a receive complete flag is set When it is set, the data is fetched in step r66 and the respective flags are reset to complete the transmission. When the receive complete flag is not set, the data transferred from the optional device side in response to a transmission request command from the main body is fetched to the main body and the respective flags are reset to complete the transmission to leave from the interrupt in steps r67 to r72.

Figure 40:
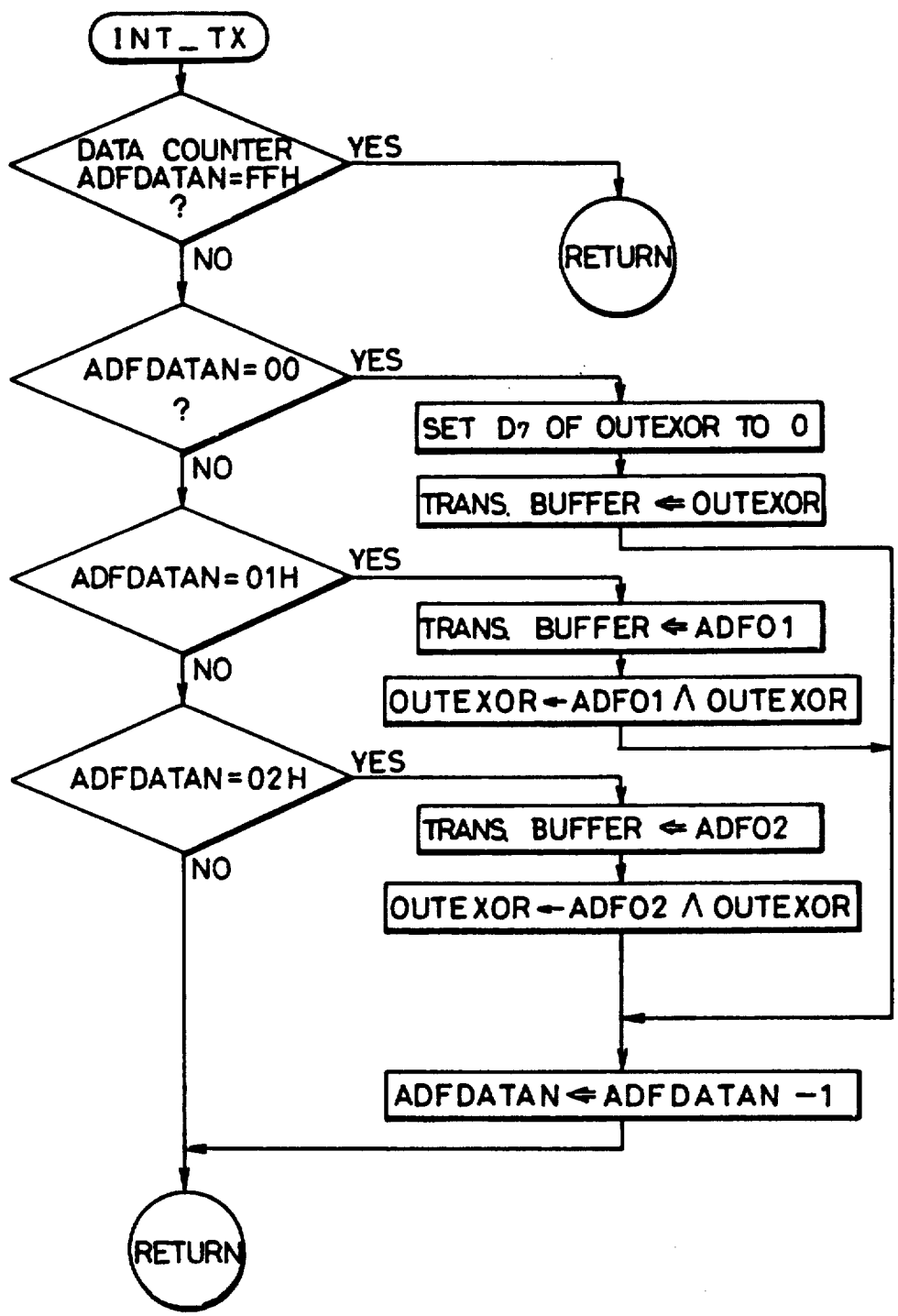

FIG. 40 shows an interrupt program when a transmission buffer in an optional device is empty. In the INT-TX program, whether a data counter ADFDATAN is FF (H) is checked. When data remains, whether the ADFDATAN is 00(H), 01 (H) or 02 (H) is checked When it is 02 (H), data of an ADF02 is set to the transmission buffer, the EXOR of the ADF02 and an OUTEXOR is obtained and set to the OUTEXOR and the ADFDATAN is decremented by 1 to leave from the interrupt. Next, when the ADFDATAN is 01 (H), the same processing as the aforesaid one is executed. When it is 00 (H), the seventh bit of the OUTEXOR is set to 0 and the OUTEXOR is set to the transmission buffer as a checksum data to leave from the interrupt and when it is OFF (H) the interrupt is left.

The execution of the data processing according to the prescribed protocols based on the aforesaid programs permits data transmission to be carried out in accordance with a serial interface system through two cables between the main body and an optional device without causing errors.

As described above, the present invention is such that a frame of transmission data comprises an address block, a data block and a checksum data block, an optional device corresponding to an address transmitted from a main body transfers data to the main body when the data received coincides with checksum data obtained in the device based on the received data and the transfer of the data is completed when the main body confirms that the transmission address coincides with the data transferred from the optional device, and when the transferred data is not returned from the optional device or the coincidence is not confirmed, it is determined that a transmission error occurs and data is transmitted from the main body again. As a result, a transmission error due to noise or the like can be prevented in advance to improve resistance to noise so that a frequency of a signal is increased to increase a transmission speed of data Further, even if many kinds of optional devices with a multi-function are connected to a single copying machine main body, the identification of the devices and the transmission of data can be effected by connecting the respective optional devices with the main body through only two cables, whereby an arrangement for processing the cables is simple and cost can be reduced.

What is claimed is:

1. A copying system comprising:
 a) a main body which performs a copying operation;
 b) a plurality of auxiliary means for executing operations in conjunction with the copying operation by said main body;
 c) primary control means for controlling the plurality of auxiliary means by generating a control signal, the control signal including an address block representing a designated auxiliary means and a command block representing a requested operation for the designated auxiliary means, the two blocks being arranged in series;
 d) connection means for connecting the primary control means to the auxiliary means to allow signals to flow therebetween, the connection means including a single main line portion and branch line portions for connecting the auxiliary means to the main line portion, said main line portion further comprising a single bus through which the address block and the command block of the control signal are transmitted to each of the auxiliary means;
 e) each of the auxiliary means including:
  i) control signal receiver means for receiving the control signal from the primary control means,
  ii) means for :
   A) discriminating if the control signal from the control signal receiver means is a signal designated for the auxiliary means,
   B) discriminating whether the control signal receiver means correctly receives the control signal, and
   C) controlling operation of the auxiliary means in response to the control signal, and
  iii) confirmation signal transmitter means for transmitting to the primary control means a confirmation signal indicating that the control signal receiver means correctly receives the control signal; and
 f) the primary control means including control signal transmitter means for transmitting the control signal to each of the auxiliary means, and confirmation signal receiver means for receiving the confirmation signal from the auxiliary means, said main line portion including a control signal main wire line and a confirmation signal main wire line, each of the branch line portions including a control signal branch wire line and a confirmation signal branch wire line, the control signal branch wire line and the confirmation signal branch wire line being connected to the control signal main wire line and the confirmation signal main wire line, respectively.

2. A copying system according to claim 1, wherein the primary control means further includes means for checking whether the confirmation signal is received for a predetermined time, and for determining that the primary control means has failed to transmit the control signal when the confirmation signal is not received for the predetermined time.

3. A copying system according to claim 1, wherein the primary control means further includes processor means for checking whether the confirmation signal is received for a predetermined time, for commanding the control signal transmitter means to transmit a control signal when the confirmation signal is not received for the predetermined time, for counting the number of transmissions of said control signal, and for judging that a maloperation occurs in one of the auxiliary means and the connection means when the confirmation signal is not received after a predetermined number of transmissions of the control signal.

4. A copying system according to claim 3, wherein the processor means judges that a maloperation occurs in one of the auxiliary means and the connection means when the confirmation signal is not received after two transmissions of said control signal.

5. A copying system according to claim 1, wherein the control signal further includes a checksum block representing check data in series form.

6. The copying system of claim 1 wherein said plurality of auxiliary means includes an automatic document feeder, a sorter, and a copying paper cassette.

* * * * *